United States Patent
Spock et al.

(10) Patent No.: US 8,842,988 B2
(45) Date of Patent: Sep. 23, 2014

(54) OPTICAL JUNCTION NODES FOR USE IN DATA CENTER NETWORKS

(75) Inventors: Derek E. Spock, Boston, MA (US); Richard A. Barry, Los Angeles, CA (US); David J. Husak, Windham, NH (US); Peter B. Everdell, Littleton, MA (US); Ruoding Li, Carlisle, MA (US)

(73) Assignee: Plexxi Inc., Nashua, NH (US)

( * ) Notice: Subject to any disclaimer, the term of this patent is extended or adjusted under 35 U.S.C. 154(b) by 74 days.

(21) Appl. No.: 13/528,211

(22) Filed: Jun. 20, 2012

(65) Prior Publication Data

US 2012/0321310 A1    Dec. 20, 2012

Related U.S. Application Data

(60) Provisional application No. 61/498,931, filed on Jun. 20, 2011, provisional application No. 61/554,107, filed on Nov. 1, 2011.

(51) Int. Cl.
*H04J 14/00* (2006.01)
*H04J 14/02* (2006.01)

(52) U.S. Cl.
CPC ............ *H04J 14/00* (2013.01); *H04J 14/0283* (2013.01); *H04J 14/021* (2013.01); *H04J 14/0206* (2013.01); *H04J 14/0238* (2013.01); *H04J 14/0275* (2013.01); *H04J 14/0228* (2013.01); *H04J 14/0217* (2013.01); *H04J 14/0269* (2013.01); *H04J 14/0213* (2013.01)
USPC .................................. 398/45; 398/58; 398/59

(58) Field of Classification Search
USPC .................. 398/45, 58, 59, 82, 83, 48–50
See application file for complete search history.

(56) References Cited

U.S. PATENT DOCUMENTS

| | | | |
|---|---|---|---|
| 5,008,881 A | 4/1991 | Karol | |
| 6,570,685 B1 | 5/2003 | Fujita et al. | |
| 6,616,349 B1 * | 9/2003 | Li et al. ............................ | 398/4 |
| 6,711,324 B1 | 3/2004 | Zang et al. | |
| 7,254,138 B2 | 8/2007 | Sandstrom | |
| 7,333,511 B2 | 2/2008 | Sandstrom | |
| 7,477,844 B2 | 1/2009 | Gumaste et al. | |
| 7,522,837 B2 | 4/2009 | Tanobe et al. | |

(Continued)

FOREIGN PATENT DOCUMENTS

| | | |
|---|---|---|
| WO | WO 2008/073636 | 6/2008 |
| WO | WO 2008/116309 | 10/2008 |

(Continued)

OTHER PUBLICATIONS

"Scalable Photonic Interconnection Network with Multiple-Layer Configuration for Warehouse-Scale Networks", Sakano et al., Optical Society of America, Aug. 2011.

(Continued)

*Primary Examiner* — Dalzid Singh
(74) *Attorney, Agent, or Firm* — Preti Flaherty Beliveau & Pachios LLP

(57) ABSTRACT

Data center network architectures, systems, and methods that can reduce the cost and complexity of data center networks. Such data center network architectures, systems, and methods employ physical optical ring network topologies, optical nodes, and optical junction nodes to efficiently allocate bandwidth within the data center networks, while reducing the overall physical interconnectivity requirements of the data center networks.

18 Claims, 10 Drawing Sheets

(56) References Cited

U.S. PATENT DOCUMENTS

| | | | |
|---|---|---|---|
| 7,826,743 B2* | 11/2010 | Tian et al. | 398/59 |
| 7,986,713 B2 | 7/2011 | Sandstrom | |
| 8,027,585 B2 | 9/2011 | Yokoyama | |
| 2002/0048066 A1* | 4/2002 | Antoniades et al. | 359/128 |
| 2002/0131118 A1 | 9/2002 | Chiaroni et al. | |
| 2003/0046127 A1 | 3/2003 | Crowe et al. | |
| 2004/0105364 A1 | 6/2004 | Chow et al. | |
| 2004/0131064 A1 | 7/2004 | Burwell et al. | |
| 2005/0044195 A1 | 2/2005 | Westfall | |
| 2006/0123477 A1 | 6/2006 | Raghavan et al. | |
| 2006/0228112 A1 | 10/2006 | Palacharla et al. | |
| 2006/0275035 A1 | 12/2006 | Way | |
| 2008/0062891 A1 | 3/2008 | Van der Merwe et al. | |
| 2008/0144511 A1 | 6/2008 | Marcondes et al. | |
| 2008/0145051 A1* | 6/2008 | Wellbrock et al. | 398/59 |
| 2009/0092064 A1 | 4/2009 | Fan et al. | |
| 2009/0138577 A1 | 5/2009 | Casado et al. | |
| 2009/0219817 A1 | 9/2009 | Carley | |
| 2009/0268605 A1 | 10/2009 | Campbell et al. | |
| 2009/0296719 A1 | 12/2009 | Maier et al. | |
| 2010/0014518 A1 | 1/2010 | Duncan et al. | |
| 2010/0115101 A1 | 5/2010 | Lain et al. | |
| 2010/0121972 A1 | 5/2010 | Samuels et al. | |
| 2010/0284691 A1 | 11/2010 | Zottmann | |
| 2011/0090892 A1 | 4/2011 | Cooke | |

FOREIGN PATENT DOCUMENTS

| | | |
|---|---|---|
| WO | WO 2009/096793 | 8/2009 |
| WO | WO 2009/151847 | 12/2009 |
| WO | WO 2010/138937 | 12/2010 |

OTHER PUBLICATIONS

"Hybrid Optical WDM Networks Utilizing Optical Waveband and Electrical Wavelength Cross-connects", Le et al. Optical Society of America, 2011.

"WDM-Based Local Lighwave Networks Part II: Multihop Systems", Biswanath Mukherjee, IEEE, Jul. 1992.

A Torus-Based 4-Way Fault-Tolerant Backbone Network Architecture for Avionic WDM LANs; The Department of Electrical and Computer Engineering, University of Florida; Dexiang Wang and Janise Y. McNair; Optical Society of America; Mar. 31, 2011.

P2i-Tours: A Hybrid Architecture for Direct Interconnection; Department of Computer Science and Technology, Tsinghua University; Chao Zhang and Menghan Li; IEEE; Dec. 24-26, 2011.

Making High Bandwidth But Low Revenue Per Bit Network Applications Profitable; Optimum Communications; Jan. 15, 2010.

A Policy-aware Switching Layer for Data Centers; Electrical Engineering and Computer Sciences, University of California at Berkeley; Dilip Antony Joseph, Arsalan Tavakoli and Ion Stoica; Jun. 24, 2008.

Optimum Communications Services: Finally a way out of the zero-sum game?; TechnologyInside on the web; Oct. 20, 2008.

Flattened Butterfly: A Cost-Efficient Topology for High-Radix Networks; John Kim, William J. Daily, Computer Systems Laboratory; Dennis Abts, Cray Inc.; Jun. 9-13, 2007.

Impact of Adaptive Layer 1 for Packet Switching Network Cost and QoS; TRLabs Next Generation Internet Workshop; Mark Sandstrom; Optimum Communications; Nov. 9, 2007.

A Proposal of Hierarchical Chordal Ring Network Topology for WDM Networks; Tomoya Kitani, Nobuo Funabiki and Teruo Higashino; IEEE; 2004.

* cited by examiner

OPTICAL JUNCTION NODES FOR USE IN DATA CENTER NETWORKS

CROSS REFERENCE TO RELATED APPLICATIONS

This application claims benefit of the priority of U.S. Provisional Patent Application No. 61/498,931 filed Jun. 20, 2011 entitled DATA CENTER NETWORK SWITCHING, and U.S. Provisional Patent Application No. 61/554,107 filed Nov. 1, 2011 entitled DATA CENTER NETWORK SWITCHING.

FIELD OF THE INVENTION

The present application relates generally to data center network architectures and switching technologies, and more specifically to data center network architectures, systems, and methods that employ optical ring network topologies, optical nodes, and optical junction nodes to efficiently allocate bandwidth within data center networks, while reducing the physical interconnectivity requirements of the data center networks.

BACKGROUND OF THE INVENTION

In recent years, university, government, business, and financial service entities, among others, have increasingly relied upon data center networks that incorporate racks of server computers ("servers") to implement application programs ("applications") for supporting their specific operational requirements, including, but not limited to, data base management applications, document and file sharing applications, searching applications, gaming applications, and financial trading applications. As such, data center networks are generally expanding in terms of the number of servers incorporated therein, as well as the networking equipment needed to interconnect the servers for accommodating the data transfer requirements of the applications that the servers are called upon to implement.

Conventional data center networks typically have hierarchical architectures, in which each server co-located in a particular rack is connected via one or more Ethernet connections to a top-of-rack Ethernet switch (the "top-of-rack switch"). A plurality of such top-of-rack switches form what is generally referred to as the "access layer", which is the lowest level of the hierarchical network architecture. The next higher level of the hierarchy is generally referred to as the "aggregation layer", which can include a plurality of Ethernet switches and/or Internet protocol (IP) routers. Each top-of-rack switch in the access layer can be connected to one or more Ethernet switches and/or IP routers in the aggregation layer. The highest level of the hierarchy is generally referred to as the "core layer", which includes a plurality of IP routers that can be configured to provide ingress/egress points for the data center network. Each Ethernet switch and/or IP router in the aggregation layer can be connected to one or more IP routers in the core layer, which, in turn, can be interconnected to one another. In such conventional data center networks, the interconnections between the racks of servers, the top-of-rack switches in the access layer, the Ethernet switches/IP routers in the aggregation layer, and the IP routers in the core layer, are typically implemented using point-to-point Ethernet links.

Although the conventional data center networks described above have been employed to satisfy the operational requirements of many university, government, business, and financial service entities, such conventional data center networks have drawbacks. For example, data communications between servers that are not co-located within the same rack may experience excessive delay (also referred to herein as "latency") within the data center network, due in no small part to the multitude of switches and/or routers that the data may be required to traverse as it propagates up, down, and across the hierarchical architecture of the network. Data communications between such servers may also experience latency within the respective switches and/or routers of the data center network due to excessive node and/or link utilization. Further, because multiple paths may be employed to deliver broadcast and/or multicast data to different destinations within the data center network, such broadcast and/or multicast data may experience excessive latency skew. Such latency and/or latency skew may be exacerbated as the size of the data center network and/or its load increases. The hierarchical architecture of the data center network also generally suffers from increasingly complex but essentially fixed fiber cabling requirements, as the numbers of switches, routers, layers, and their interconnections are increased to handle the expansion of the data center network.

It would therefore be desirable to have data center network architectures, systems, and methods that avoid at least some of the drawbacks of the conventional data center networks described above.

BRIEF SUMMARY OF THE INVENTION

In accordance with the present application, data center network architectures, systems, and methods are disclosed that can reduce the cost and complexity of data center networks. Such data center network architectures, systems, and methods can employ physical optical ring network topologies, optical nodes, and optical junction nodes to efficiently allocate bandwidth within the data center networks, while reducing the overall physical interconnectivity requirements of the data center networks.

In one aspect, an exemplary data center network architecture includes at least one optical ring network having a plurality of optical nodes (also referred to herein as the "optical node ring"). In an exemplary aspect, the physical topology of the optical node ring can be characterized as an optical multi-fiber ring, and the switching topology of the optical node ring can be characterized as a chordal ring. Each optical node can be communicably coupled, through one or more downlink ports, to one or more server computers ("servers") for use in running one or more application programs ("applications"), storing data, etc. Such servers can operate either alone or in association with one or more other servers, which can be communicably coupled to the same optical node, or separate optical node(s), through one or more uplink ports. In a further exemplary aspect, each optical node can employ optical spatial division multiplexing (SDM) and/or wavelength division multiplexing (WDM). Further, links interconnecting the respective optical nodes on the optical ring network can be implemented using a single optical fiber pair configuration, or multi-fiber pair configurations.

In another aspect, at least some of the optical nodes on the optical node ring can incorporate an optical filter configuration that implements a hybrid SDM/WDM channel plan. Each such optical node includes at least one pair of ports (e.g., at least two (2) ports) physically connected to at least two (2) nodes, respectively, on the optical node ring. Each port of the optical node is operative to handle bidirectional traffic in the "West-to-East" and "East-to-West" directions relative to the optical node. Each port of the optical node can be implemented using a multi-fiber ribbon connector that provides a linear array of optical fibers to the optical node. The optical fibers of each port have corresponding positions in the linear array, thereby defining a first predetermined sequence of optical fibers in the linear array. Each port of the optical node includes a plurality of inputs and a plurality of outputs. The optical node further includes a plurality of optical connection paths configured to implement the hybrid SDM/WDM channel plan. The plurality of optical connection paths are disposed between the respective inputs of one port in the pair of ports and the respective outputs of the other port in the pair of ports. Each of the plurality of inputs, as well as each of the plurality of outputs, have specific positions in the respective ports that correspond to the first predetermined sequence of optical fibers. To implement the hybrid SDM/WDM channel plan, at least some of the plurality of optical connection paths are configured to communicably couple a respective input of one port in the pair of ports with a respective output of the other port in the pair of ports, such that the specific positions of the respective input and the respective output differ by at least one position relative to the first predetermined sequence of optical fibers. For example, such optical connection paths can each be configured to communicably couple an output of one port in the pair of ports having a first position in the first predetermined sequence of optical fibers with an input of the other port in the pair of ports having a second position that differs from the first position by one consecutive position in the first predetermined sequence. To further implement the hybrid SDM/WDM channel plan, the plurality of optical connection paths are each configured to implement one or more WDM wavelength channels. The optical node additionally includes a plurality of optical DMUX filters ("drop modules"), and a plurality of optical MUX filters ("add modules"). Each of the drop modules is operative to separate one or more WDM signals allocated to one or more predetermined wavelength channels (also referred to herein as "wavelengths") from an optical signal conveyed over a respective optical connection path within the optical node. Such wavelengths can be provided, through one or more downlinks, to one or more servers communicably coupled to the optical node. Each of the add modules is operative to add one or more wavelengths, which can be provided by the server(s) through one or more uplinks, to a respective optical connection path within the optical node. In accordance with the hybrid SDM/WDM channel plan, the plurality of drop modules and the plurality of add modules are configured and arranged so that the switching topology of the optical node ring resembles the chordal ring.

In still another aspect, the exemplary data center network architecture includes a plurality of optical node rings, each having a plurality of optical nodes, and at least one additional optical ring network having a plurality of optical junction nodes (also referred to herein as the "junction node ring") for interconnecting the plurality of optical node rings. The optical junction nodes on the junction node ring can provide topological connections between two or more of the plurality of optical node rings. Each optical junction node can include at least two pairs of ports (e.g., at least four (4) ports). Each port can be implemented using a multi-fiber ribbon connector that provides a linear array of optical fibers to the optical junction node. The optical fibers of a first pair of ports have positions in the linear array that correspond to the first predetermined sequence of optical fibers discussed above with reference to the optical node. Further, the optical fibers of a second pair of ports can have positions in the linear array that correspond to a second predetermined sequence of optical fibers. In an exemplary aspect, the first pair of ports of the optical junction node are physically connected to two (2) optical nodes, respectively, on one of the plurality of optical node rings, and the second pair of ports of the optical junction node are physically connected to two (2) other optical junction nodes, respectively, on the junction node ring. The first and second pairs of ports are operative to handle bidirectional traffic in the West-to-East and East-to-West directions relative to the optical junction node. Using the first and second pairs of ports, the optical junction node can receive one or more wavelengths that would normally be destined for an optical node(s) on a first optical node ring, and redirect the respective wavelengths through the junction node ring to an optical node(s) on a second optical node ring, thereby providing a mechanism by which optical nodes on separate optical node rings can communicate with one another. Each port of the optical junction node includes a plurality of inputs and a plurality of outputs. The optical junction node further includes a first plurality of optical connection paths and a second plurality of optical connection paths. The first plurality of optical connection paths are disposed between the respective inputs of one port in the first pair of ports and the respective outputs of the other port in the first pair of ports. The second plurality of optical connection paths are disposed between the respective inputs of one port in the second pair of ports and the respective outputs of the other port in the second pair of ports. Each of the plurality of inputs and each the plurality of outputs of the first pair of ports have specific positions relative to the first predetermined sequence of optical fibers. Further, at least some of the first plurality of optical connection paths are configured to communicably couple a respective input of one port in the first pair of ports with a respective output of the other port in the first pair of ports, such that the specific positions of the respective input and the respective output differ by at least one position relative to the first predetermined sequence of optical fibers. Each of the plurality of inputs and each of the plurality of outputs of the second pair of ports have specific positions relative to the second predetermined sequence of optical fibers. Further, at least some of the second plurality of optical connection paths are configured to communicably couple a respective input of one port in the second pair of ports with a respective output of the other port in the second pair of ports, such that the specific positions of the respective input and the respective output differ by at least one position relative to the second predetermined sequence of optical fibers. To provide at least one connection for conveying optical signals from an optical node ring to the junction node ring, at least one of the optical connection paths within the optical junction node is configured to communicably couple an input of one port in the first pair of ports connected to the optical node ring with an output of one port in the second pair of ports connected to the junction node ring. In this way, at least one connection can be provided for conveying optical signals from an optical node ring to the junction node ring in the West-to-East and/or East-to-West direction(s) relative to the optical junction node. At least some of the optical connection paths within the optical junction node can be configured to implement one or more WDM wavelength channels. The optical junction node additionally includes a plurality of drop modules communicably coupled to at least some of the second plurality of optical connection paths, respectively, and a plurality of add modules communicably coupled to at least some of the first plurality of optical connection paths, respectively. The drop modules are operative to separate one or more wavelengths from optical signals received from the junction node ring and conveyed over respective ones of the second plurality of optical connection paths, and the add modules are operative to add the separated wavelengths to respective ones of the first plurality of optical connection paths for subsequent transmission over the optical node ring. In this way, at least one connection can be provided for conveying optical signals from the junction node ring to an optical node ring in the West-to-East and/or East-to-West direction(s) relative to the optical junction node. By selecting suitable wavelengths at corresponding optical nodes on one or more of the plurality of optical node rings, low latency communications can be achieved between any desired optical node rings that are interconnected by the junction node ring. Moreover, by scaling optical nodes across multiple optical node rings interconnected by one or more such junction node rings, the creation of unduly large optical node rings can be avoided.

In a further aspect, a junction node ring can be used to form a low latency optical path around a large optical node ring. To that end, at least two (2) optical junction nodes on the junction node ring can be connected between at least two (2) pairs of optical nodes, respectively, at remote locations on the large optical node ring, thereby forming a low latency optical path between the remote locations on the optical node ring through the junction node ring. Further, suitable wavelengths can be selected at corresponding optical nodes on the large optical node ring, thereby specifying which wavelengths can have access to the low latency optical path around the optical node ring, as well as how far the respective wavelengths can travel around the optical node ring.

Other features, functions, and aspects of the invention will be evident from the Drawings and/or the Detailed Description of the Invention that follow.

BRIEF DESCRIPTION OF THE SEVERAL VIEWS OF THE DRAWINGS

The invention will be more fully understood with reference to the following Detailed Description of the Invention in conjunction with the drawings of which.

DETAILED DESCRIPTION OF THE INVENTION

The disclosures of U.S. Provisional Patent Application No. 61/498,931 filed Jun. 20, 2011 entitled DATA CENTER NETWORK SWITCHING, U.S. Provisional Patent Application No. 61/554,107 filed Nov. 1, 2011 entitled DATA CENTER NETWORK SWITCHING, and U.S. patent application Ser. No. 13/528,501 filed Jun. 20, 2012 entitled OPTICAL ARCHITECTURE AND CHANNEL PLAN EMPLOYING MULTI-FIBER CONFIGURATIONS FOR DATA CENTER NETWORK SWITCHING, are incorporated herein by reference in their entirety.

Data center network architectures, systems, and methods are disclosed that can reduce the cost and complexity of data center networks. Such data center network architectures, systems, and methods can employ physical optical ring network topologies, optical nodes, and optical junction nodes to efficiently allocate bandwidth within the data center networks, while reducing the overall physical interconnectivity requirements of the data center networks.

Figure 1:
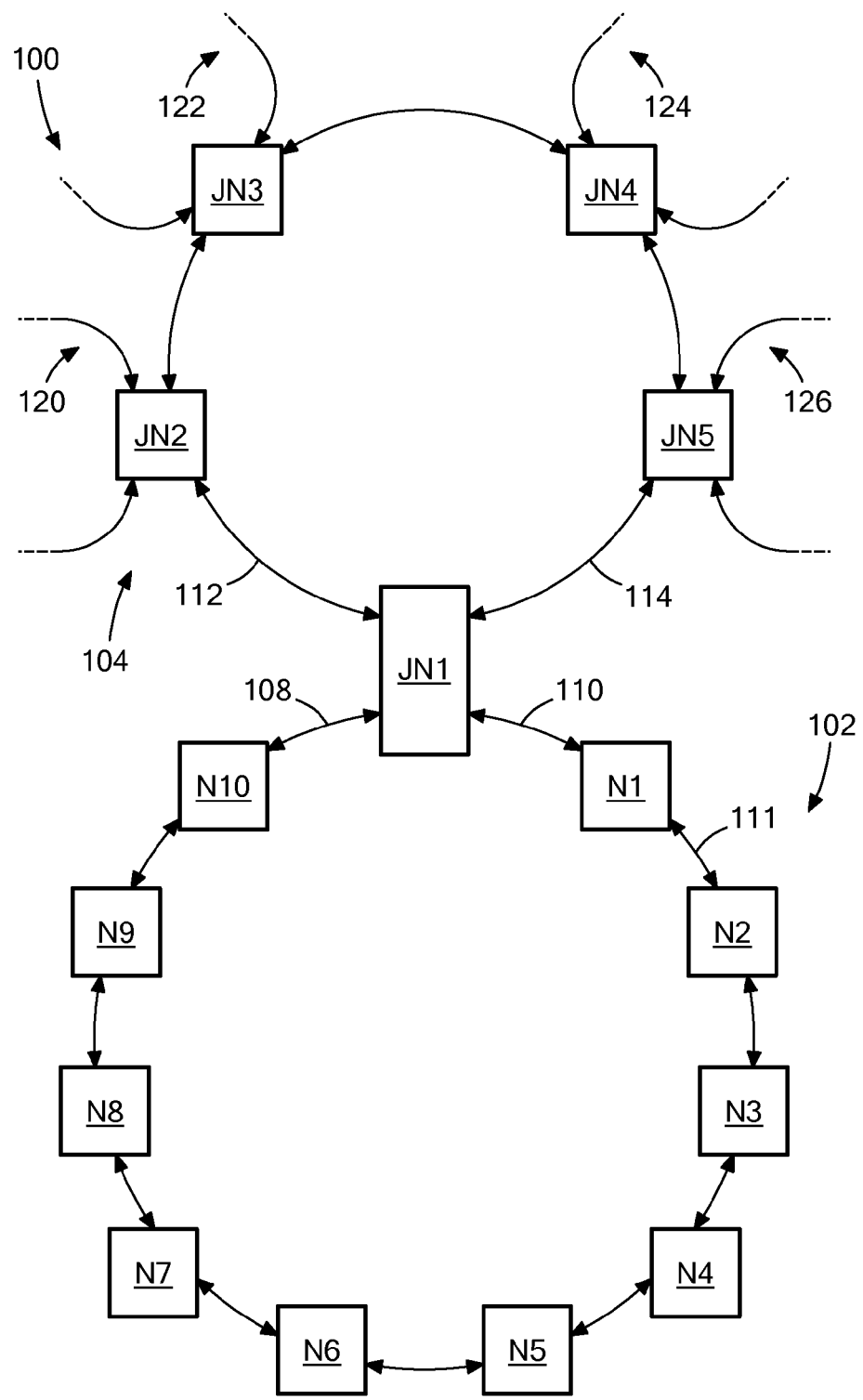
FIG. 1 is a block diagram of an exemplary optical node ring that includes a plurality of optical nodes, and an exemplary junction node ring that includes a plurality of optical junction nodes, configured in accordance with the present application.

FIG. 1 depicts an illustrative embodiment of an exemplary data center network architecture 100, in accordance with the present application. As shown in FIG. 1, the data center network architecture 100 includes an exemplary optical node ring 102 having a plurality of optical nodes N1 through N10, and an exemplary junction node ring 104 having a plurality of optical junction nodes JN1 through JN5. Each of optical nodes N1-N10 on the optical node ring 102 can be communicably coupled, through one or more downlink ports, to one or more computerized devices, such as one or more server computers ("servers") for use in running one or more application programs ("applications"), storing data, etc. Such servers can operate either alone or in association with one or more other servers, which can be communicably coupled to the same optical node, or separate optical node(s), through one or more uplink ports. For example, the plurality of optical nodes N1-N10 and the respective server(s) coupled thereto can communicate through the various uplink/downlink ports using a 10 Gb Ethernet protocol, or any other suitable protocol. Further, each optical node N1-N10, as well as each optical junction node JN1-JN5, can employ optical wavelength division multiplexing (WDM), dense wavelength division multiplexing (DWDM), or coarse wavelength division multiplexing (CWDM). In addition, links interconnecting optical nodes N1-N10 on the optical node ring 102, links interconnecting optical junction nodes JN1-JN5 on the junction node ring 104, as well as link(s) interconnecting one or more of optical junctions nodes JN1-JN5 with one or more of optical nodes N1-N10, can be implemented using a single optical fiber pair configuration, or multi-fiber pair configurations, including, e.g., one or more multi-fiber ribbon cables and connectors, such as MTP® multi-fiber ribbon cables/connectors or any other suitable cables/connectors. It is noted that such multi-fiber ribbon connectors may be employed to assure that the respective fibers maintain predetermined positions relative to one another while optical junction nodes JN1-JN5 are being installed on the junction node ring 104.

Optical junction nodes JN1-JN5 on the junction node ring 104 (see FIG. 1) are communicably coupleable to respective optical nodes on the same optical node ring, or on different optical node rings. For purposes of illustration, FIG. 1 depicts optical junction node JN1 on the junction node ring 104 communicably coupled between optical node N1 and optical node N10 on the optical node ring 102 (see FIG. 1). Optical junction nodes JN2-JN5 on the junction node ring 104 can be similarly communicably coupled between any pair of optical nodes on optical node rings 120, 122, 124, 126, respectively. As further shown in FIG. 1, optical junction node JN1 on the junction node ring 104 is connected to optical junction node JN2 and optical junction node JN5 by a bidirectional link 112 and a bidirectional link 114, respectively. Optical junction node JN1 is also connected to optical node N10 and optical node N1 by a bidirectional link 108 and a bidirectional link 110, respectively.

Figure 2:
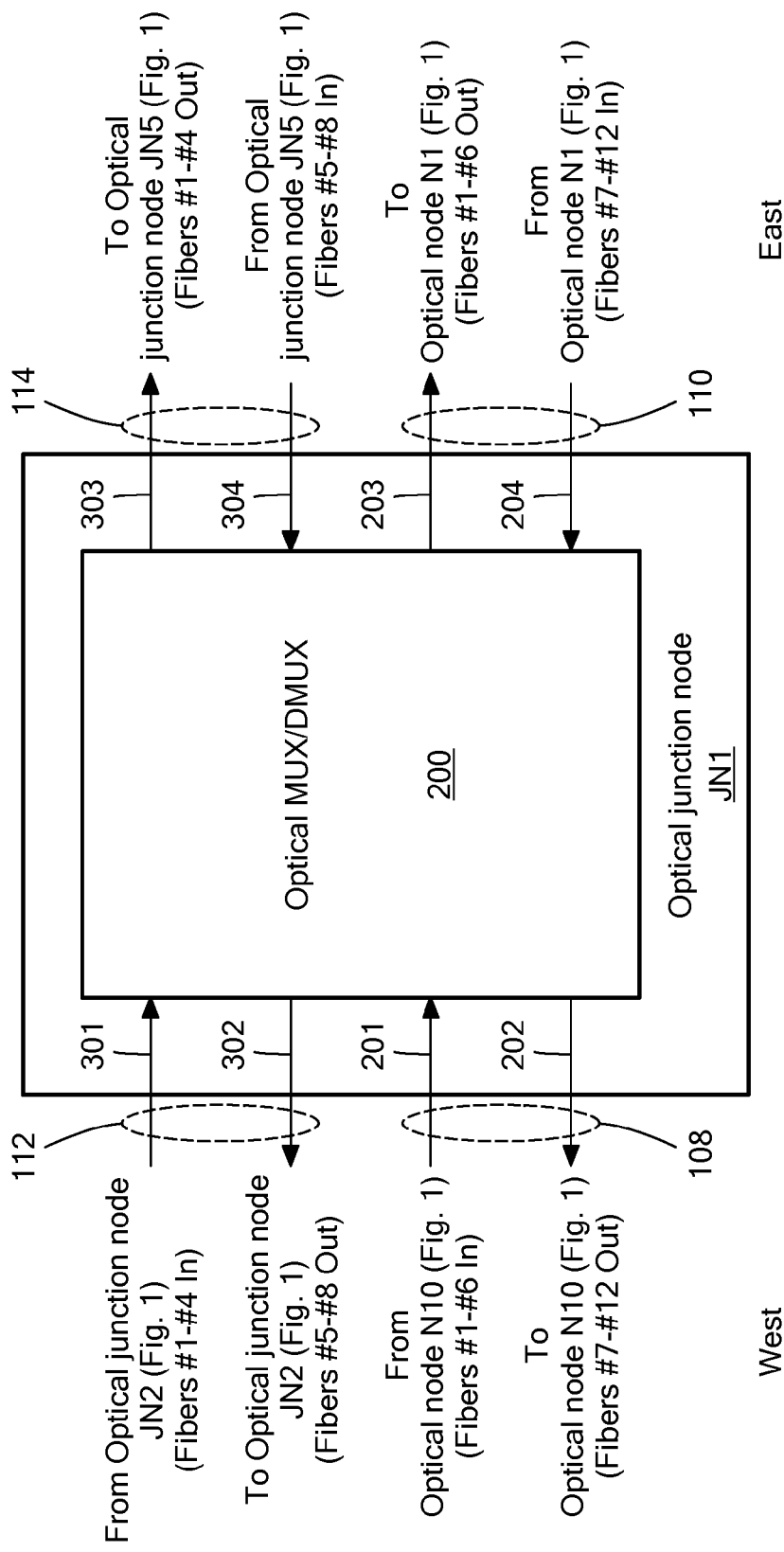
FIG. 2 is a block diagram of an exemplary optical junction node included in the junction node ring of FIG. 1.

FIG. 2 depicts an illustrative embodiment of optical junction node JN1 on the junction node ring 104 (see also FIG. 1). It is noted that the other optical junction nodes JN2-JN5 on the junction node ring 104 can be similarly configured to optical junction node JN1. As shown in FIG. 2, optical junction node JN1 includes an optical MUX/DMUX module 200. As described above, the links (e.g., the links 108, 110) interconnecting the optical junction node JN1 and the respective optical nodes N1, N10 on the optical ring network 102, as well as the links (e.g., the links 112, 114) interconnecting the optical junction node JN1 and the respective optical junction nodes JN2, JN5 on the junction node ring 104, can be implemented using one or more multi-fiber ribbon cables. For example, such multi-fiber ribbon cables can include twelve (12) optical fibers, or any other suitable number of optical fibers.

As shown in FIG. 2, the link 108 interconnecting optical junction node JN1 with optical node N10 includes a first sub-link 201 for conveying optical signals from optical node N10 to optical junction node JN1, and a second sub-link 202 for conveying optical signals from optical junction node JN1 to optical node N10. The first sub-link 201 can include six (6) optical fibers designated as fibers #1-#6 (in), and the second sub-link 202 can include six (6) optical fibers designated as fibers #7-#12 (out) Likewise, the link 110 interconnecting optical junction node JN1 with optical node N1 includes a first sub-link 203 for conveying optical signals from optical junction node JN1 to optical node N1, and a second sub-link 204 for conveying optical signals from optical node N1 to optical junction node JN1. The first sub-link 203 can include six (6) optical fibers designated as fibers #1-#6 (out), and the second sub-link 204 can include six (6) optical fibers designated as fibers #7-#12 (in).

As further shown in FIG. 2, the link 112 interconnecting optical junction node JN1 with optical junction node JN2 includes a first sub-link 301 for conveying optical signals from optical junction node JN2 to optical junction node JN1, and a second sub-link 302 for conveying optical signals from optical junction node JN1 to optical junction node JN2. The first sub-link 301 can include four (4) optical fibers designated as fibers #1-#4 (in), and the second sub-link 302 can include four (4) optical fibers designated as fibers #5-#8 (out). Likewise, the link 114 interconnecting optical junction node JN1 with optical junction node JN5 includes a first sub-link 303 for conveying optical signals from optical junction node JN1 to optical junction node JN5, and a second sub-link 304 for conveying optical signals from optical junction node JN5 to optical junction node JN1. The first sub-link 303 can include four (4) optical fibers designated as fibers #1-#4 (out), and the second sub-link 304 can include four (4) optical fibers designated as fibers #5-#8 (in).

Optical nodes N1-N10 on the optical node ring 102 (see FIG. 1), as well as optical junction nodes JN1-JN5 on the junction node ring 104 (see FIG. 1), can be configured to implement any suitable spatial division multiplexing (SDM)/wavelength division multiplexing (WDM) channel plan for supporting any suitable number of wavelength channels. For purposes of illustration, optical nodes N1-N10 and optical junction nodes JN1-JN5 are described herein as being configured to implement a predetermined hybrid SDM/WDM channel plan for supporting eight (8) wavelength channels.

Figure 3A:
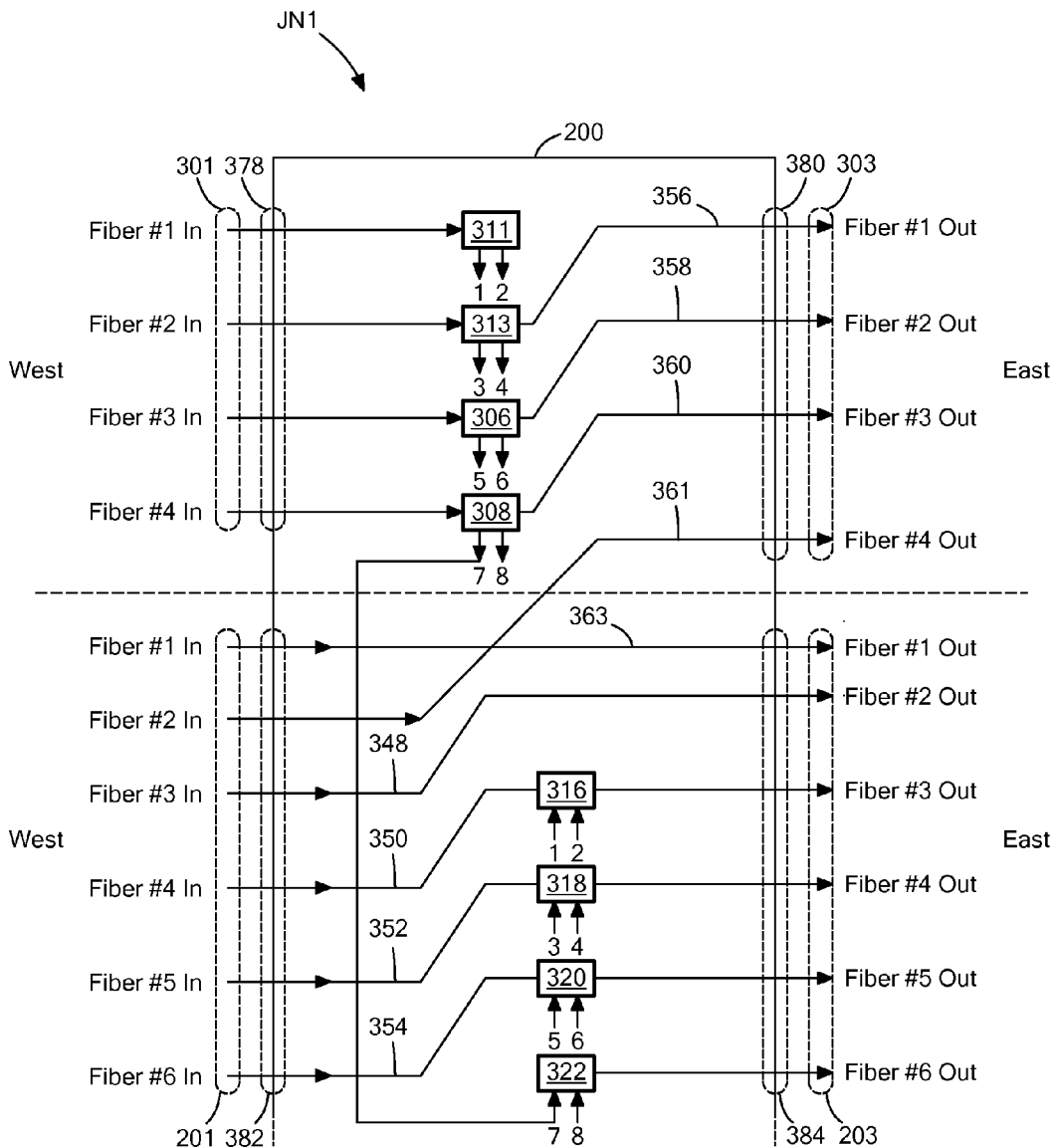
FIGS. 3a and 3b are schematic diagrams of an exemplary optical MUX/DMUX module included in the optical junction node of FIG. 2.
Figure 3B:
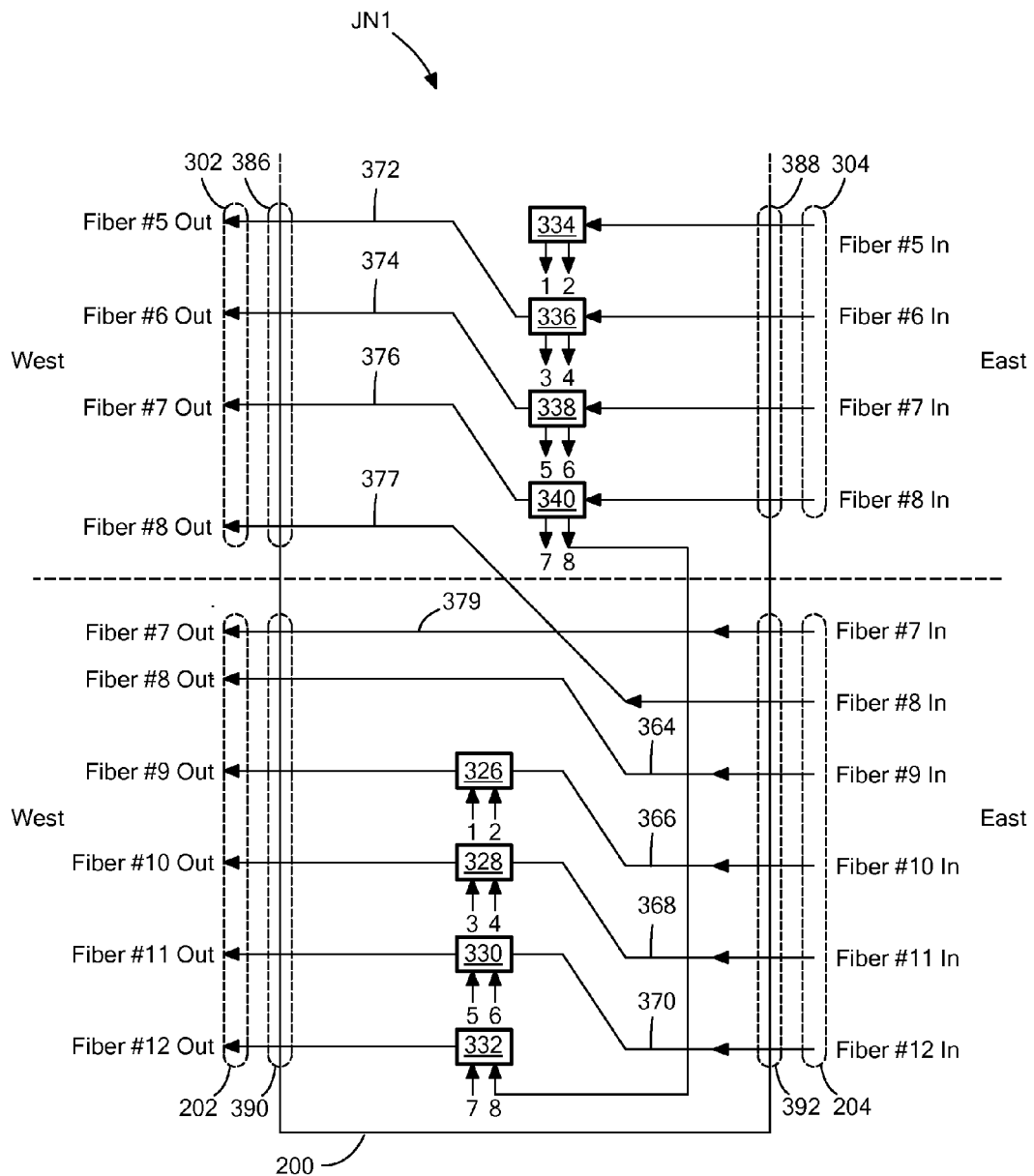

FIGS. 3a and 3b depict an illustrative embodiment of the optical MUX/DMUX module 200 (see also FIG. 2) included in optical junction node JN1. With reference to the optical MUX/DMUX module 200 (see FIG. 3a), the sub-link 201 of the link 108 (see FIGS. 1, 2) interconnecting optical junction node JN1 with optical node N10 includes six (6) optical fibers in a predetermined sequence corresponding to fibers #1-#6, and the sub-link 203 of the link 110 (see FIGS. 1, 2) interconnecting optical junction node JN1 with optical node N1 includes six (6) optical fibers in the predetermined sequence corresponding to fibers #1-#6. As shown in FIG. 3a, the optical MUX/DMUX module 200 includes a plurality of inputs (generally indicated by reference numeral 382) corresponding to the respective fibers #1-#6 (in), and a plurality of outputs (generally indicated by reference numeral 384) corresponding to the respective fibers #1-#6 (out). The optical MUX/DMUX module 200 further includes a plurality of optical connection paths, such as optical connection paths 348, 350, 352, 354, disposed between the respective inputs 382 corresponding to fibers #3-#6 (in) of the sub-link 201, and the respective outputs 384 corresponding to fibers #2-#5 (out) of the sub-link 203. In addition, the optical MUX/DMUX module 200 includes an optical connection path 361 disposed between the respective input 382 corresponding to fiber #2 (in) of the sub-link 201 and the respective output 380 corresponding to fiber #4 (out) of the sub-link 303, as well as an optical connection path 363 disposed between the respective input 382 corresponding to fiber #1 (in) of the sub-link 201 and the respective output 384 corresponding to fiber #1 (out) of the sub-link 203.

To implement the predetermined SDM/WDM channel plan for supporting the eight (8) wavelength channels 1-8, at least some of the plurality of optical connection paths included in the optical MUX/DMUX module 200, such as the optical connection paths 348, 350, 352, 354, are configured to communicably couple a respective one of the inputs 382 with a respective one of the outputs 384, such that the specific positions of the respective input and the respective output differ by at least one position in the predetermined sequence of fibers #1-#6. For example, the optical connection path 354 is configured to communicably couple the respective output that has a position in the predetermined sequence corresponding to fiber #5 (out) of the sub-link 203, with the respective input that has a position in the predetermined sequence corresponding to fiber #6 (in) of the sub-link 201. Further, the optical connection path 352 is configured to communicably couple the respective output that has a position in the predetermined sequence corresponding to fiber #4 (out) of the sub-link 203, with the respective input that has a position in the predetermined sequence corresponding to fiber #5 (in) of the sub-link 201. Moreover, the optical connection path 350 is configured to communicably couple the respective output that has a position in the predetermined sequence corresponding to fiber #3 (out) of the sub-link 203, with the respective input that has a position in the predetermined sequence corresponding to fiber #4 (in) of the sub-link 201. In addition, the optical connection path 348 is configured to communicably couple the respective output that has a position in the predetermined sequence corresponding to fiber #2 (out) of the sub-link 203, with the respective input that has a position in the predetermined sequence corresponding to fiber #3 (in) of the sub-link 201.

With further reference to the optical MUX/DMUX module 200 of FIG. 3a, the sub-link 301 of the link 112 (see FIGS. 1, 2) interconnecting optical junction node JN1 with optical junction node JN2 includes four (4) optical fibers in a predetermined sequence corresponding to fibers #1-#4, and the sub-link 303 of the link 114 (see FIGS. 1, 2) interconnecting optical junction node JN1 with optical junction node JN5 includes four (4) optical fibers in the predetermined sequence corresponding to fibers #1-#4. As shown in FIG. 3a, the optical MUX/DMUX module 200 includes a plurality of inputs (generally indicated by reference numeral 378) corresponding to the respective fibers #1-#4 (in), and a plurality of outputs (generally indicated by reference numeral 380) corresponding to the respective fibers #1-#4 (out). The optical MUX/DMUX module 200 further includes a plurality of optical connection paths, such as optical connection paths 356, 358, 360, disposed between the respective inputs 378 corresponding to fibers #2-#4 (in) of the sub-link 301, and the respective outputs 380 corresponding to fibers #1-#3 (out) of the sub-link 303.

At least some of the plurality of optical connection paths included in the optical MUX/DMUX module 200, such as the optical connection paths 356, 358, 360, are configured to communicably couple a respective one of the inputs 378 with a respective one of the outputs 380, such that the specific positions of the respective input and the respective output differ by at least one position in the predetermined sequence of fibers #1-#4. For example, the optical connection path 360 is configured to communicably couple the respective output that has a position in the predetermined sequence corresponding to fiber #3 (out) of the sub-link 303, with the respective input that has a position in the predetermined sequence corresponding to fiber #4 (in) of the sub-link 301. Further, the optical connection path 358 is configured to communicably couple the respective output that has a position in the predetermined sequence corresponding to fiber #2 (out) of the sub-link 303, with the respective input that has a position in the predetermined sequence corresponding to fiber #3 (in) of the sub-link 301. Moreover, the optical connection path 356 is configured to communicably couple the respective output that has a position in the predetermined sequence corresponding to fiber #1 (out) of the sub-link 303, with the respective input that has a position in the predetermined sequence corresponding to fiber #2 (in) of the sub-link 301.

As shown in FIG. 3a, the optical MUX/DMUX module 200 included in optical junction node JN1 further includes a plurality of optical DMUX filters ("drop modules") 311, 313, 306, 308. The drop module 311 is operative to separate one or more wavelength channel signals allocated to channels 1-2 from an optical signal received over fiber #1 (in) of the sub-link 301, and the drop module 313 is operative to separate one or more wavelength channel signals allocated to channels 3-4 from an optical signal received over fiber #2 (in) of the sub-link 301. Further, the drop module 306 is operative to separate one or more wavelength channel signals allocated to channels 5-6 from an optical signal received over fiber #3 (in) of the sub-link 301, and the drop module 308 is operative to separate one or more wavelength channel signals allocated to channels 7-8 from an optical signal received over fiber #4 (in) of the sub-link 301. The optical MUX/DMUX module 200 also includes a plurality of optical MUX filters ("add modules") 316, 318, 320, 322.

The drop modules 311, 313, 306, 308 within the optical MUX/DMUX module 200 of optical junction node JN1 provide the respective wavelength channel signals allocated to channels 1-8 (i.e., channels 1-8 West-to-East) to one or more of the add modules 316, 318, 320, 322, as appropriate. Specifically, the drop module 311 provides the respective wavelength channel signals (also referred to herein as the "wavelengths") allocated to channels 1, 2 (i.e., channels 1-2 West-to-East) to the add module 316, which is operative to add the wavelengths allocated to channels 1-2 West-to-East to an optical signal for transmission over fiber #3 (out) of the sub-link 203. The drop module 313 provides the wavelengths allocated to channels 3, 4 (i.e., channels 3-4 West-to-East) to the add module 318, which is operative to add the wavelengths allocated to channels 3-4 West-to-East to an optical signal for transmission over fiber #4 (out) of the sub-link 203. The drop module 306 provides the wavelengths allocated to channels 5, 6 (i.e., channels 5-6 West-to-East) to the add module 320, which is operative to add the wavelengths allocated to channels 5-6 West-to-East to an optical signal for transmission over fiber #5 (out) of the sub-link 203. The drop module 308 provides the wavelengths allocated to channels 7, 8 (i.e., channels 7-8 West-to-East) to the add module 322, which is operative to add the wavelengths allocated to channels 7-8 West-to-East to an optical signal for transmission over fiber #6 (out) of the sub-link 203. It is noted that FIG. 3a only depicts the connection between the drop module 308 and the add module 322 for the wavelength channel 7 for clarity of illustration.

With further reference to the optical MUX/DMUX module 200 (see FIG. 3b), the sub-link 202 of the link 108 (see FIGS. 1, 2) interconnecting optical junction node JN1 with optical node N10 includes six (6) optical fibers in a predetermined sequence corresponding to fibers #7-#12, and the sub-link 204 of the link 110 (see FIGS. 1, 2) interconnecting optical junction node JN1 with optical node N1 includes six (6) optical fibers in the predetermined sequence corresponding to fibers #7-#12. As shown in FIG. 3b, the optical MUX/DMUX module 200 further includes a plurality of inputs (generally indicated by reference numeral 392) corresponding to the respective fibers #7-#12 (in), and a plurality of outputs (generally indicated by reference numeral 390) corresponding to the respective fibers #7-#12 (out). In addition, the optical MUX/DMUX module 200 includes a plurality of optical connection paths, such as optical connection paths 364, 366, 368, 370, disposed between the respective inputs 392 corresponding to fibers #9-#12 (in) of the sub-link 204, and the respective outputs 390 corresponding to fibers #8-#11 (out) of the sub-link 202. In addition, the optical MUX/DMUX module 200 includes an optical connection path 377 disposed between the respective input 392 corresponding to fiber #8 (in) of the sub-link 204 and the respective output 386 corresponding to fiber #8 (out) of the sub-link 302, as well as an optical connection path 379 disposed between the respective input 392 corresponding to fiber #7 (in) of the sub-link 204 and the respective output 390 corresponding to fiber #7 (out) of the sub-link 202.

To further implement the predetermined SDM/WDM channel plan for supporting the eight (8) wavelength channels 1-8, at least some of the plurality of optical connection paths 364, 366, 368, 370 are configured to communicably couple a respective one of the inputs 392 with a respective one of the outputs 390, such that the specific positions of the respective input and the respective output differ by at least one position in the predetermined sequence of fibers #7-#12. For example, the optical connection path 370 is configured to communicably couple the respective output that has a position in the predetermined sequence corresponding to fiber #11 (out) of the sub-link 202, with the respective input that has a position in the predetermined sequence corresponding to fiber #12 (in) of the sub-link 204. Further, the optical connection path 368 is configured to communicably couple the respective output that has a position in the predetermined sequence corresponding to fiber #10 (out) of the sub-link 202, with the respective input that has a position in the predetermined sequence corresponding to fiber #11 (in) of the sub-link 204. Moreover, the optical connection path 366 is configured to communicably couple the respective output that has a position in the predetermined sequence corresponding to fiber #9 (out) of the sub-link 202, with the respective input that has a position in the predetermined sequence corresponding to fiber #10 (in) of the sub-link 204. In addition, the optical connection path 364 is configured to communicably couple the respective output that has a position in the predetermined sequence corresponding to fiber #8 (out) of the sub-link 202, with the respective input that has a position in the predetermined sequence corresponding to fiber #9 (in) of the sub-link 204.

With reference to the optical MUX/DMUX module 200 of FIG. 3b, the sub-link 302 of the link 112 (see FIGS. 1, 2) interconnecting optical junction node JN1 with optical junction node JN2 includes four (4) optical fibers in a predetermined sequence corresponding to fibers #5-#8, and the sub-link 304 of the link 114 (see FIGS. 1, 2) interconnecting optical junction node JN1 with optical junction node JN5 includes four (4) optical fibers in the predetermined sequence corresponding to fibers #5-#8. The optical MUX/DMUX module 200 further includes a plurality of inputs (generally indicated by reference numeral 388) corresponding to the respective fibers #5-#8 (in), and a plurality of outputs (generally indicated by reference numeral 386) corresponding to the respective fibers #5-#8 (out). In addition, the optical MUX/DMUX module 200 includes a plurality of optical connection paths, such as optical connection paths 372, 374, 376, disposed between the respective inputs 388 corresponding to fibers #6-#8 (in) of the sub-link 304, and the respective outputs 386 corresponding to fibers #5-#7 (out) of the sub-link 302.

At least some of the plurality of optical connection paths included in the optical MUX/DMUX module 200, such as the optical connection paths 372, 374, 376, are configured to communicably couple a respective one of the inputs 388 with a respective one of the outputs 386, such that the specific positions of the respective input and the respective output differ by at least one position in the predetermined sequence of fibers #5-#8. For example, the optical connection path 376 is configured to communicably couple the respective output that has a position in the predetermined sequence corresponding to fiber #7 (out) of the sub-link 302, with the respective input that has a position in the predetermined sequence corresponding to fiber #8 (in) of the sub-link 304. Further, the optical connection path 374 is configured to communicably couple the respective output that has a position in the predetermined sequence corresponding to fiber #6 (out) of the sub-link 302, with the respective input that has a position in the predetermined sequence corresponding to fiber #7 (in) of the sub-link 304. Moreover, the optical connection path 372 is configured to communicably couple the respective output that has a position in the predetermined sequence corresponding to fiber #5 (out) of the sub-link 302, with the respective input that has a position in the predetermined sequence corresponding to fiber #6 (in) of the sub-link 304.

As shown in FIG. 3b, the optical MUX/DMUX module 200 included in optical junction node JN1 further includes a plurality of drop modules 334, 336, 338, 340. The drop module 334 is operative to separate one or more wavelengths allocated to channels 1-2 from an optical signal received over fiber #5 (in) of the sub-link 304, and the drop module 336 is operative to separate one or more wavelengths allocated to channels 3-4 from an optical signal received over fiber #6 (in) of the sub-link 304. Further, the drop module 338 is operative to separate one or more wavelengths allocated to channels 5-6 from an optical signal received over fiber #7 of the sub-link 304, and the drop module 340 is operative to separate one or more wavelengths allocated to channels 7-8 from an optical signal received over fiber #8 (in) of the sub-link 304. The optical MUX/DMUX module 200 also includes a plurality add modules 316, 318, 320, 322.

The drop modules 334, 336, 338, 340 within the optical MUX/DMUX module 200 of optical junction node JN1 provide the respective wavelengths allocated to channels 1-8 (i.e., channels 1-8 East-to-West) to one or more of the add modules 326, 328, 330, 332, as appropriate. Specifically, the drop module 334 provides the wavelengths allocated to channels 1, 2 (i.e., channels 1-2 East-to-West) to the add module 326, which is operative to add the wavelengths allocated to channels 1-2 East-to-West to an optical signal for transmission over fiber #9 (out) of the sub-link 202. The drop module 336 provides the wavelengths allocated to channels 3, 4 (i.e., channels 3-4 East-to-West) to the add module 328, which is operative to add the wavelengths allocated to channels 3-4 East-to-West to an optical signal for transmission over fiber #10 (out) of the sub-link 202. The drop module 338 provides the wavelengths allocated to channels 5, 6 (i.e., channels 5-6 East-to-West) to the add module 330, which is operative to add the wavelengths allocated to channels 5-6 East-to-West to an optical signal for transmission over fiber #11 (out) of the sub-link 202. The drop module 340 provides the wavelengths allocated to channels 7, 8 (i.e., channels 7-8 East-to-West) to the add module 332, which is operative to add the wavelengths allocated to channels 7-8 East-to-West to an optical signal for transmission over fiber #12 (out) of the sub-link 202. It is noted that FIG. 3b only depicts the connection between the drop module 340 and the add module 332 for the wavelength channel 8 for clarity of illustration.

Figure 4:
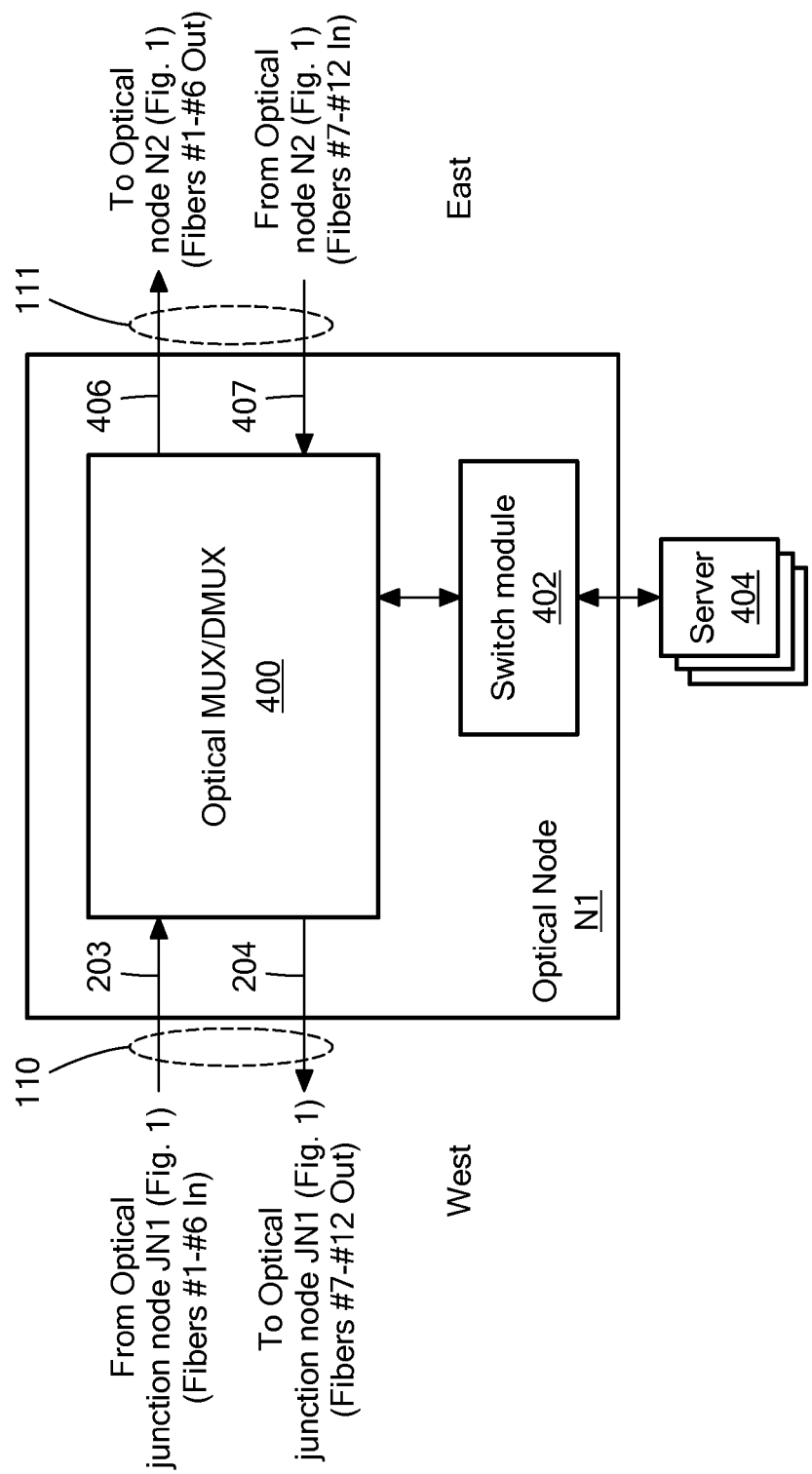
FIG. 4 is a block diagram of an exemplary optical node included in the optical node ring of FIG. 1.

FIG. 4 depicts an illustrative embodiment of optical node N1 on the optical ring network 102 (see also FIG. 1). It is noted that the other optical nodes N2-N10 on the optical ring network 102 can be similarly configured to optical node N1. As shown in FIG. 4, optical node N1 includes an optical MUX/DMUX module 400 and a switch module 402, which is communicably coupled between the optical MUX/DMUX module 400 and one or more servers 404. The switch module 402 is communicably coupled to the server(s) 404 by one or more bidirectional links. Optical node N1 is connected to optical junction node JN1 and optical node N2 by the link 110 and a link 111, respectively Like the link 110, the link 111 interconnecting the respective optical nodes N1-N2 on the optical ring network 102 can be implemented using one or more multi-fiber ribbon cables.

As shown in FIG. 4, the link 110 interconnecting optical node N1 with optical junction node JN1 includes the sub-link 203 for conveying optical signals from optical junction node JN1 to optical node N1, and the sub-link 204 for conveying optical signals from optical node N1 to optical junction node JN1. Further, the link 111 interconnecting optical node N1 with optical node N2 includes a first sub-link 406 for conveying optical signals from optical node N1 to optical node N2, and a second sub-link 407 for conveying optical signals from optical node N2 to optical node N1. The first sub-link 406 can include six (6) optical fibers designated as fibers #1-#6 (out), and the second sub-link 407 can include six (6) optical fibers designated as fibers #7-#12 (in).

Figure 5A:
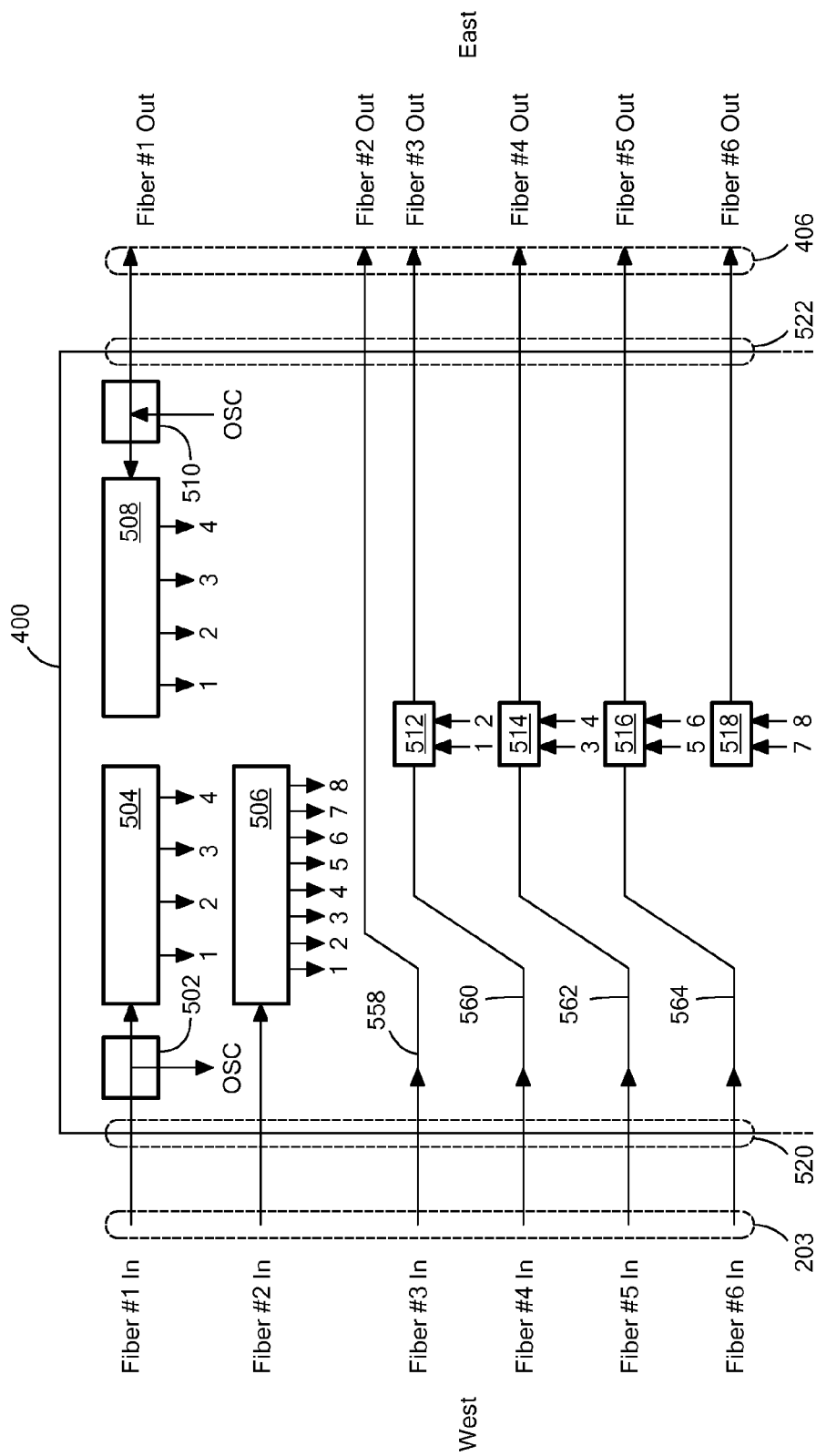
FIGS. 5a and 5b are schematic diagrams of an exemplary optical MUX/DMUX module included in the optical node of FIG. 4.
Figure 5B:
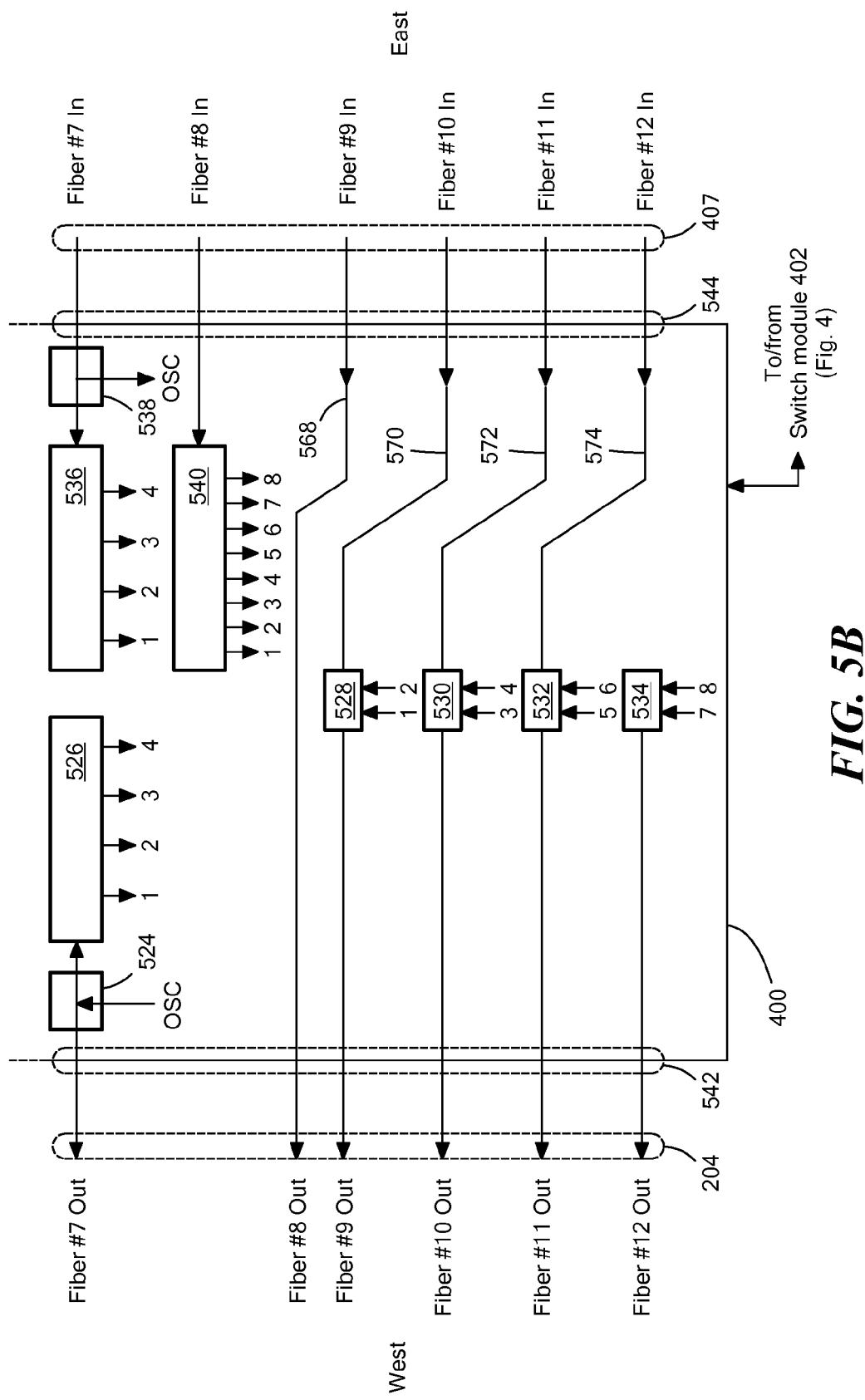

FIGS. 5a and 5b depict an illustrative embodiment of the optical MUX/DMUX module 400 (see also FIG. 4) included in optical node N1. With reference to the optical MUX/DMUX module 400 (see FIG. 3a), the sub-link 203 of the link 110 (see FIGS. 1, 4) interconnecting optical node N1 with optical junction node JN1 includes the six (6) optical fibers in the predetermined sequence corresponding to fibers #1-#6, and the sub-link 406 of the link 111 (see FIGS. 1, 4) interconnecting optical node N1 with optical node N2 includes six (6) optical fibers in the predetermined sequence corresponding to fibers #1-#6. As shown in FIG. 5a, the optical MUX/DMUX module 400 includes a plurality of inputs (generally indicated by reference numeral 520) corresponding to the respective fibers #1-#6 (in), and a plurality of outputs (generally indicated by reference numeral 522) corresponding to the respective fibers #1-#6 (out). The optical MUX/DMUX module 400 further includes a plurality of optical connection paths, such as optical connection paths 558, 560, 562, 564, disposed between the respective inputs 520 corresponding to fibers #3-#6 (in) of the sub-link 203, and the respective outputs 522 corresponding to fibers #2-#5 (out) of the sub-link 406.

As shown in FIG. 5*a*, the optical MUX/DMUX module 400 included in optical node N1 further includes a plurality of drop modules 502, 504, 506. The drop module 504 is operative to separate one or more wavelengths allocated to channels 1-4 from an optical signal received over fiber #1 (in) of the sub-link 203, and to provide the respective wavelengths allocated to channels 1-4 to the switch module 402 (see FIGS. 4, 5*b*). The drop module 506 is operative to separate one or more wavelengths allocated to channels 1-8 from an optical signal received over fiber #2 (in) of the sub-link 203, and to provide the respective wavelengths allocated to channels 1-8 to the switch module 402 (see FIGS. 4, 5*b*). The drop module 502 is operative to separate an optical supervisory channel (OSC) signal from an optical signal received over fiber #1 (in) of the sub-link 203, and to provide the OSC signal to the switch module 402 (see FIGS. 4, 5*b*).

As further shown in FIG. 5*a*, the optical MUX/DMUX module 400 also includes a plurality of add modules 508, 510, 512, 514, 516, 518. The add module 508 is operative to receive one or more of the wavelengths allocated to channels 1-4 from the switch module 402, and to add the respective wavelengths allocated to channels 1-4 to an optical signal for transmission over fiber #1 (out) of the sub-link 406. The add module 512 is operative to receive one or more of the wavelengths allocated to channels 1-2 from the switch module 402, and to add the respective wavelengths allocated to channels 1-2 to an optical signal for transmission over fiber #3 (out) of the sub-link 406. The add module 514 is operative to receive one or more of the wavelengths allocated to channels 3-4 from the switch module 402, and to add the respective wavelengths allocated to channels 3-4 to an optical signal for transmission over fiber #4 (out) of the sub-link 406. The add module 516 is operative to receive one or more of the wavelengths allocated to channels 5-6 from the switch module 402, and to add the respective wavelengths allocated to channels 5-6 to an optical signal for transmission over fiber #5 (out) of the sub-link 406. The add module 518 is operative to receive one or more of the wavelengths allocated to channels 7-8 from the switch module 402, and to add the respective wavelengths allocated to channels 7-8 to an optical signal for transmission over fiber #6 (out) of the sub-link 406. The add module 510 is operative to receive the OSC signal from the switch module 402, and to add the OSC signal to an optical signal for transmission over fiber #1 (out) of the sub-link 406.

As shown in FIG. 5*b*, the optical MUX/DMUX module 400 further includes a plurality of inputs (generally indicated by reference numeral 544) corresponding to the respective fibers #7-#12 (in), and a plurality of outputs (generally indicated by reference numeral 542) corresponding to the respective fibers #7-#12 (out). The optical MUX/DMUX module 400 also includes a plurality of optical connection paths, such as optical connection paths 568, 570, 572, 574, disposed between the respective inputs 544 corresponding to fibers #9-#12 (in) of the sub-link 407, and the respective outputs 542 corresponding to fibers #8-#11 (out) of the sub-link 204.

As shown in FIG. 5*b*, the optical MUX/DMUX module 400 included in optical node N1 further includes a plurality of drop modules 536, 538, 540. The drop module 536 is operative to separate one or more wavelengths allocated to channels 1-4 from an optical signal received over fiber #7 (in) of the sub-link 407, and to provide the respective wavelengths allocated to channels 1-4 to the switch module 402 (see FIGS. 4, 5*b*). The drop module 540 is operative to separate one or more wavelengths allocated to channels 1-8 from an optical signal received over fiber #8 (in) of the sub-link 407, and to provide the respective wavelengths allocated to channels 1-8 to the switch module 402 (see FIGS. 4, 5*b*). The drop module 538 is operative to separate the OSC signal from an optical signal received over fiber #7 (in) of the sub-link 407, and to provide the OSC signal to the switch module 402 (see FIGS. 4, 5*b*).

As further shown in FIG. 5*b*, the optical MUX/DMUX module 400 also includes a plurality of add modules 524, 526, 528, 530, 532, 534. The add module 526 is operative to receive one or more of the wavelengths allocated to channels 1-4 from the switch module 402, and to add the respective wavelengths allocated to channels 1-4 to an optical signal for transmission over fiber #7 (out) of the sub-link 204. The add module 528 is operative to receive one or more of the wavelengths allocated to channels 1-2 from the switch module 402, and to add the respective wavelengths allocated to channels 1-2 to an optical signal for transmission over fiber #9 (out) of the sub-link 204. The add module 530 is operative to receive one or more of the wavelengths allocated to channels 3-4 from the switch module 402, and to add the respective wavelengths allocated to channels 3-4 to an optical signal for transmission over fiber #10 (out) of the sub-link 204. The add module 532 is operative to receive one or more of the wavelengths allocated to channels 5-6 from the switch module 402, and to add the respective wavelengths allocated to channels 5-6 to an optical signal for transmission over fiber #11 (out) of the sub-link 204. The add module 534 is operative to receive one or more of the wavelengths allocated to channels 7-8 from the switch module 402, and to add the respective wavelengths allocated to channels 7-8 to an optical signal for transmission over fiber #12 (out) of the sub-link 204. The add module 524 is operative to receive the OSC signal from the switch module 402, and to add the OSC signal to an optical signal for transmission over fiber #7 (out) of the sub-link 204.

Figure 6:
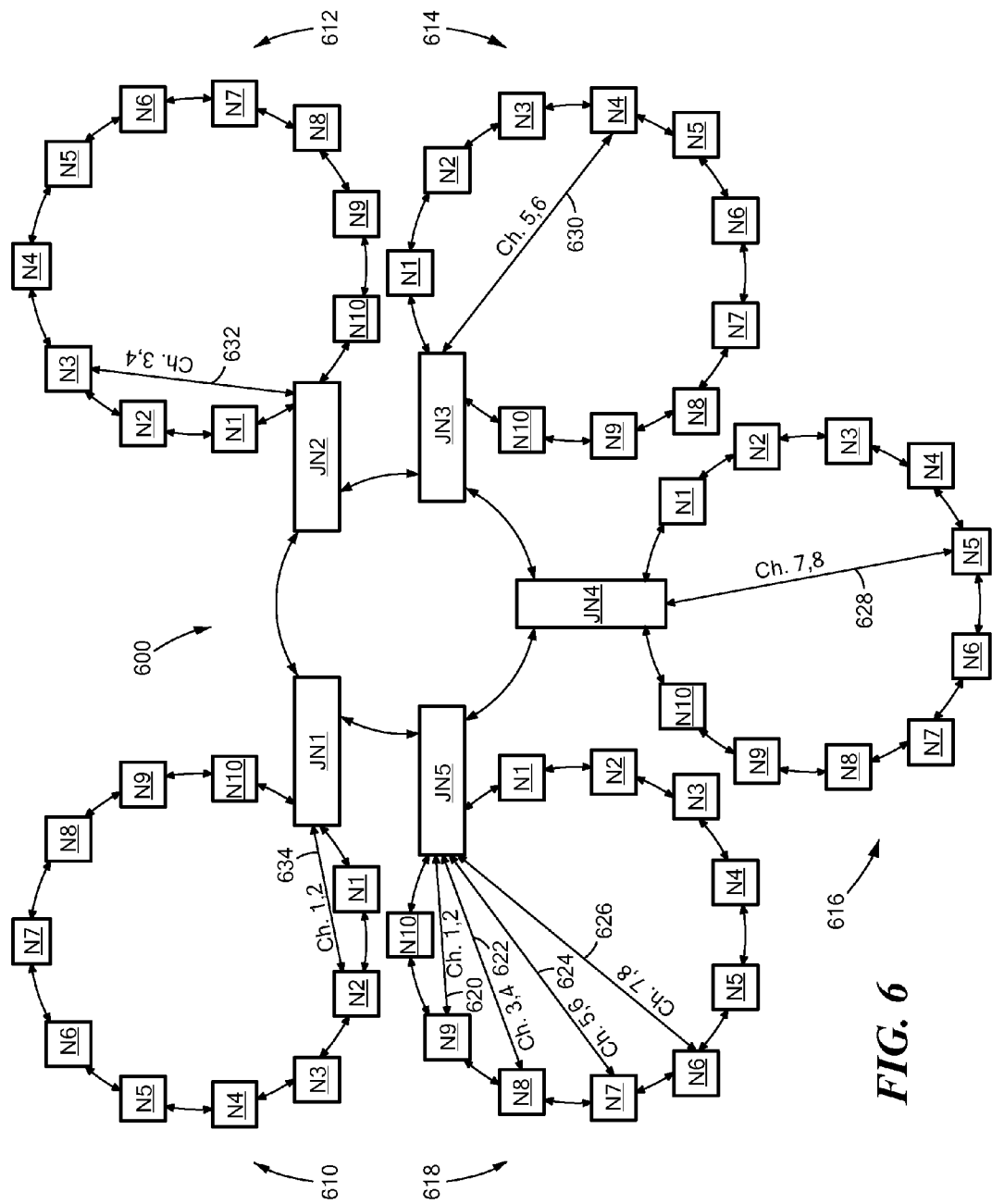
FIG. 6 is a block diagram of an exemplary junction node ring that includes a plurality of optical junction nodes, each optical junction node being connected to an exemplary optical node ring that includes a plurality of optical nodes.

FIG. 6 depicts an exemplary junction node ring 600 including five (5) optical junction nodes JN1, JN2, JN3, JN4, JN5 that can be used to interconnect a plurality of optical node rings, such as exemplary optical node rings 610, 612, 614, 616, 618. As shown in FIG. 6, the optical node rings 610, 612, 614, 616, 618 each include ten (10) optical nodes, namely, optical nodes N1, N2, N3, N4, N5, N6, N7, N8, N9, N10. It is noted that the junction node ring 600 includes five (5) optical junction nodes for purposes of illustration, and that the junction node ring 600 can alternatively be configured to include any other suitable number of optical junction nodes. Likewise, the optical node rings 610, 612, 614, 616, 618 each include ten (10) optical nodes for purposes of illustration, but may alternatively be configured to include any other suitable number of optical nodes. It is further noted that each of optical junction nodes JN1, JN2, JN3, JN4, JN5 on the junction node ring 600 (see FIG. 6) can be similarly configured to optical junction node JN1 of FIG. 2, and that each of optical nodes N1, N2, N3, N4, N5, N6, N7, N8, N9, N10 on the respective optical node rings 610, 612, 614, 616, 618 can be similarly configured to optical node N1 of FIG. 4.

As shown in FIG. 6, optical junction node JN1 is connected between optical node N1 and optical node N10 on the optical node ring 610. Likewise, optical junction node JN2 is connected between optical node N1 and optical node N10 on the optical node ring 612, optical junction node JN3 is connected between optical node N1 and optical node N10 on the optical node ring 614, optical junction node JN4 is connected between optical node N1 and optical node N10 on the optical node ring 616, and optical junction node JN5 is connected between optical node N1 and optical node N10 on the optical node ring 618. By sending optical signals over one or more selected wavelength channels between one of the optical node rings 610, 612, 614, 616, 618, and any other one or more of the optical node rings 610, 612, 614, 616, 618, such optical signals can be sent to any desired optical node(s) on the respective optical node ring(s) 610, 612, 614, 616, 618 with reduced latency. Moreover, by scaling optical nodes N1, N2, N3, N4, N5, N6, N7, N8, N9, N10 across the multiple optical node rings 610, 612, 614, 616, 618 using optical junction nodes JN1, JN2, JN3, JN4, JN5, the creation of unduly large optical node rings can be avoided.

The transmission of optical signals between the respective optical node rings 610, 612, 614, 616, 618 using optical junction nodes JN1, JN2, JN3, JN4, JN5 will be further understood with reference to the following illustrative example and FIG. 6. In this illustrative example, it is assumed that each of the optical nodes N1 through N10 on each of the optical node rings 610, 612, 614, 616, 618 includes an optical MUX/DMUX module like the optical MUX/DMUX module 400 of FIGS. 5a-5b, and that each of the optical junction nodes JN1, JN2, JN3, JN4, JN5 includes an optical MUX/DMUX module like the optical MUX/DMUX module 200 of FIGS. 3a-3b.

In this example, wavelengths are to be sent over channels 7, 8 from optical node N6 on the optical node ring 618 for receipt at optical node N5 on the optical node ring 616. To that end, the add module 518 included in optical node N6 on the optical node ring 618 adds the wavelengths allocated to channels 7-8 (the "wavelengths 7, 8") to fiber #6 (out) of the sub-link 406, allowing the wavelengths 7, 8 to be transmitted in a clockwise manner (e.g., in the West-to-East direction relative to each optical node) along the optical node ring 618. At optical node N7 on the optical node ring 618, the wavelengths 7, 8 are received over fiber #6 (in) of the sub-link 203, and shifted out over fiber #5 (out) of the sub-link 406. At optical node N8 on the optical node ring 618, the wavelengths 7, 8 are received over fiber #5 (in) of the sub-link 203, and shifted out over fiber #4 (out) of the sub-link 406. At optical node N9 on the optical node ring 618, the wavelengths 7, 8 are received over fiber #4 (in) of the sub-link 203, and shifted out over fiber #3 (out) of the sub-link 406. At optical node N10 on the optical node ring 618, the wavelengths 7, 8 are received over fiber #3 (in) of the sub-link 203, and shifted out over fiber #2 (out) of the sub-link 406. At optical junction node JN5 on the junction node ring 600, the wavelengths 7, 8 are received over fiber #2 (in) of the sub-link 201, and shifted out over fiber #4 (out) of the sub-link 303, allowing the wavelengths 7, 8 to be transmitted in a counter clockwise manner (e.g., in the West-to-East direction relative to each optical junction node) along the junction node ring 600. At optical junction node JN4 on the junction node ring 600, the wavelengths 7, 8 are received over fiber #4 (in) of the sub-link 301. Further, the drop module 308 on fiber #4 (in) of optical junction node JN4 separates the wavelengths 7, 8 from fiber #4 (in) of the sub-link 301, and provides the wavelengths 7, 8 to its add module 322, which adds the wavelengths 7, 8 to fiber #6 (out) of the sub-link 203. At optical node N1 on the optical node ring 616, the wavelengths 7, 8 are received over fiber #6 (in) of the sub-link 203, and shifted out over fiber #5 (out) of the sub-link 406. At optical node N2 on the optical node ring 616, the wavelengths 7, 8 are received over fiber #5 (in) of the sub-link 203, and shifted out over fiber #4 (out) of the sub-link 406. At optical node N2 on the optical node ring 616, the wavelengths 7, 8 are received over fiber #5 (in) of the sub-link 203, and shifted out over fiber #4 (out) of the sub-link 406. At optical node N3 on the optical node ring 616, the wavelengths 7, 8 are received over fiber #4 (in) of the sub-link 203, and shifted out over fiber #3 (out) of the sub-link 406. At optical node N4 on the optical node ring 616, the wavelengths 7, 8 are received over fiber #3 (in) of the sub-link 203, and shifted out over fiber #2 (out) of the sub-link 406. At optical node N5 on the optical node ring 616, the wavelengths 7, 8 are received over fiber #2 (in) of the sub-link 203. Further, the drop module 506 on fiber #2 (in) of optical node N5 separates the wavelengths 7, 8 from fiber #2 (in) of the sub-link 203, and provides the wavelengths 7, 8 to the switch module 402 for subsequent processing.

It is noted that optical connection path 626 represents a bidirectional logical connection for the wavelengths 7, 8 between optical node N6 on optical node ring 618 and optical junction node JN5, and optical connection path 628 represents a bidirectional logical connection for the wavelengths 7, 8 between optical node N5 on optical node ring 616 and optical junction node JN4. It is further noted that wavelengths may alternatively be transmitted in a counter clockwise manner along the optical node ring 618, and that wavelengths may alternatively be transmitted in a clockwise manner along the junction node ring 600.

In an analogous fashion, wavelengths can be sent over channels 5, 6 from optical node N7 on the optical node ring 618 to optical node N4 on the optical node ring 614. Further, wavelengths can be sent over channels 3, 4 from optical node N8 on the optical node ring 618 to optical node N3 on the optical node ring 612. In addition, wavelengths can be sent over channels 1, 2 from optical node N9 on the optical node ring 618 to optical node N2 on the optical node ring 610. It is noted that optical connection path 624 represents a bidirectional logical connection for the wavelengths 5, 6 between optical node N7 on optical node ring 618 and optical junction node JN5, and optical connection path 630 represents a bidirectional logical connection for the wavelengths 5, 6 between optical node N4 on optical node ring 614 and optical junction node JN3. Further, optical connection path 622 represents a bidirectional logical connection for the wavelengths 3, 4 between optical node N8 on optical node ring 618 and optical junction node JN5, and optical connection path 632 represents a bidirectional logical connection for the wavelengths 3, 4 between optical node N3 on optical node ring 612 and optical junction node JN2. In addition, optical connection path 620 represents a bidirectional logical connection for the wavelengths 1, 2 between optical node N9 on optical node ring 618 and optical junction node JN5, and optical connection path 634 represents a bidirectional logical connection for the wavelengths 1, 2 between optical node N2 on optical node ring 610 and optical junction node JN1.

Figure 7:
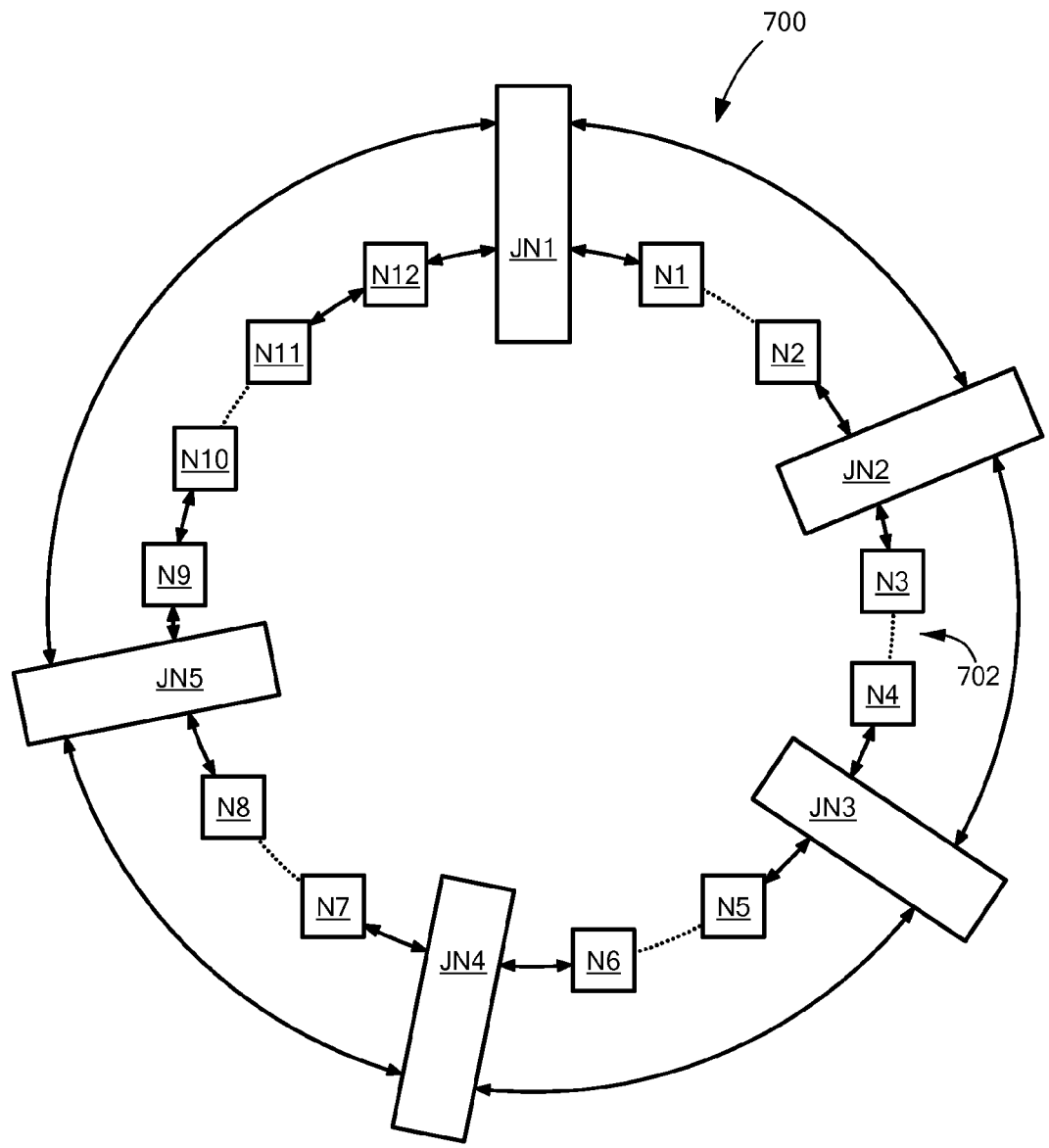
FIG. 7 is a block diagram of an exemplary junction node ring that includes a plurality of optical junction nodes, the optical junction nodes being connected between different pairs of optical nodes on the same exemplary optical node ring.

FIG. 7 depicts an exemplary junction node ring 700, and an exemplary optical node ring 702. As shown in FIG. 7, the junction node ring 700 includes five (5) optical junction nodes, namely, JN1, JN2, JN3, JN4, JN5, and the optical node ring 702 includes twelve (12) optical nodes, namely, optical nodes N1, N2, N3, N4, N5, N6, N7, N8, N9, N10, N11, N12. It is noted that the junction node ring 700 includes five (5) optical junction nodes for purposes of illustration, and that the junction node ring 700 can alternatively be configured to include any other suitable number of optical junction nodes. Likewise, the optical node ring 702 includes twelve (12) optical nodes for purposes of illustration, but may alternatively be configured to include any other suitable number of optical nodes. It is further noted that each of optical junction nodes JN1, JN2, JN3, JN4, JN5 on the junction node ring 700

(see FIG. 7) can be similarly configured to optical junction node JN1 of FIG. 2, and that each of optical nodes N1, N2, N3, N4, N5, N6, N7, N8, N9, N10, N11, N12 on the optical node ring 702 can be similarly configured to optical node N1 of FIG. 4.

As shown in FIG. 7, optical junction node JN1 is connected between optical node N1 and optical node N12, optical junction node JN2 is connected between optical node N2 and optical node N3, optical junction node JN3 is connected between optical node N4 and optical node N5, optical junction node JN4 is connected between optical node N6 and optical node N7, and optical junction node JN5 is connected between optical node N8 and optical node N9. By sending optical signals over one or more selected wavelength channels via one or more of optical junction nodes JN1 through JN5, the respective optical signals can be sent to optical nodes that may be remotely located from one another on the same optical node ring 702 with low latency.

The transmission of optical signals between respective optical nodes, such as optical nodes N11 and N10, on the optical node ring 702, in a clockwise fashion (i.e., in the West-to-East direction relative to each optical node) via optical junction nodes JN1, JN2, JN3, JN4, JN5 on the junction node ring 700, will be further understood with reference to the following illustrative example and FIG. 7. In this illustrative example, it is assumed that each of the optical nodes N1 through N12 on the optical node ring 702 includes an optical MUX/DMUX module like the optical MUX/DMUX module 400 of FIGS. 5a-5b, and that each of the optical junction nodes JN1, JN2, JN3, JN4, JN5 includes an optical MUX/DMUX module like the optical MUX/DMUX module 200 of FIGS. 3a-3b Further, in this example, optical signals are to be sent over channels 1, 2 from optical node N11 to optical node N10 on the same optical node ring 702.

To that end, the add module 512 included in optical node N11 adds the wavelengths allocated to channels 1-2 (the "wavelengths 1, 2") to fiber #3 (out) of the sub-link 406, allowing the wavelengths 1, 2 to be transmitted in a clockwise manner (i.e., in the West-to-East direction relative to each optical node) along the optical node ring 702. At optical node N12, the wavelengths 1, 2 are received over fiber #3 (in) of the sub-link 203, and shifted out over fiber #2 (out) of the sub-link 406. At optical junction node JN1, the wavelengths 1, 2 are received over fiber #2 (in) of the sub-link 201, and shifted out over fiber #4 (out) of the sub-link 303, allowing the wavelengths 1, 2 to be transmitted in a clockwise manner (i.e., in the West-to-East direction relative to each optical junction node) along the junction node ring 700. At optical junction node JN2, the wavelengths 1, 2 are received over fiber #4 (in) of the sub-link 301, and shifted out over fiber #3 (out) of the sub-link 303. At optical junction node JN3, the wavelengths 1, 2 are received over fiber #3 (in) of the sub-link 301, and shifted out over fiber #2 (out) of the sub-link 303. At optical junction node JN4, the wavelengths 1, 2 are received over fiber #2 (in) of the sub-link 301, and shifted out over fiber #1 (out) of the sub-link 303. At optical junction node JN5, the wavelengths 1, 2 are received over fiber #1 (in) of the sub-link 301. Further, the drop module 311 on fiber #1 (in) of optical junction node JN5 separates the wavelengths 1, 2 from fiber #1 (in) of the sub-link 301, and provides the wavelengths 1, 2 to its add module 316, which adds the wavelengths 1, 2 to fiber #3 (out) of the sub-link 203. At optical node N9, the wavelengths 1, 2 are received over fiber #3 (in) of the sub-link 203, and shifted out over fiber #2 (out) of the sub-link 406. At optical node N10, the wavelengths 1, 2 are received over fiber #2 (in) of the sub-link 203. Further, the drop module 506 on fiber #2 (in) of optical node N10 separates the wavelengths 1, 2 from fiber #2 (in) of the sub-link 203, and provides the wavelengths 1, 2 to the switch module 402 for subsequent processing. It is noted that wavelengths may alternatively be transmitted in a counter clockwise manner along the optical node ring 702 and the junction node ring 700.

Figure 8:
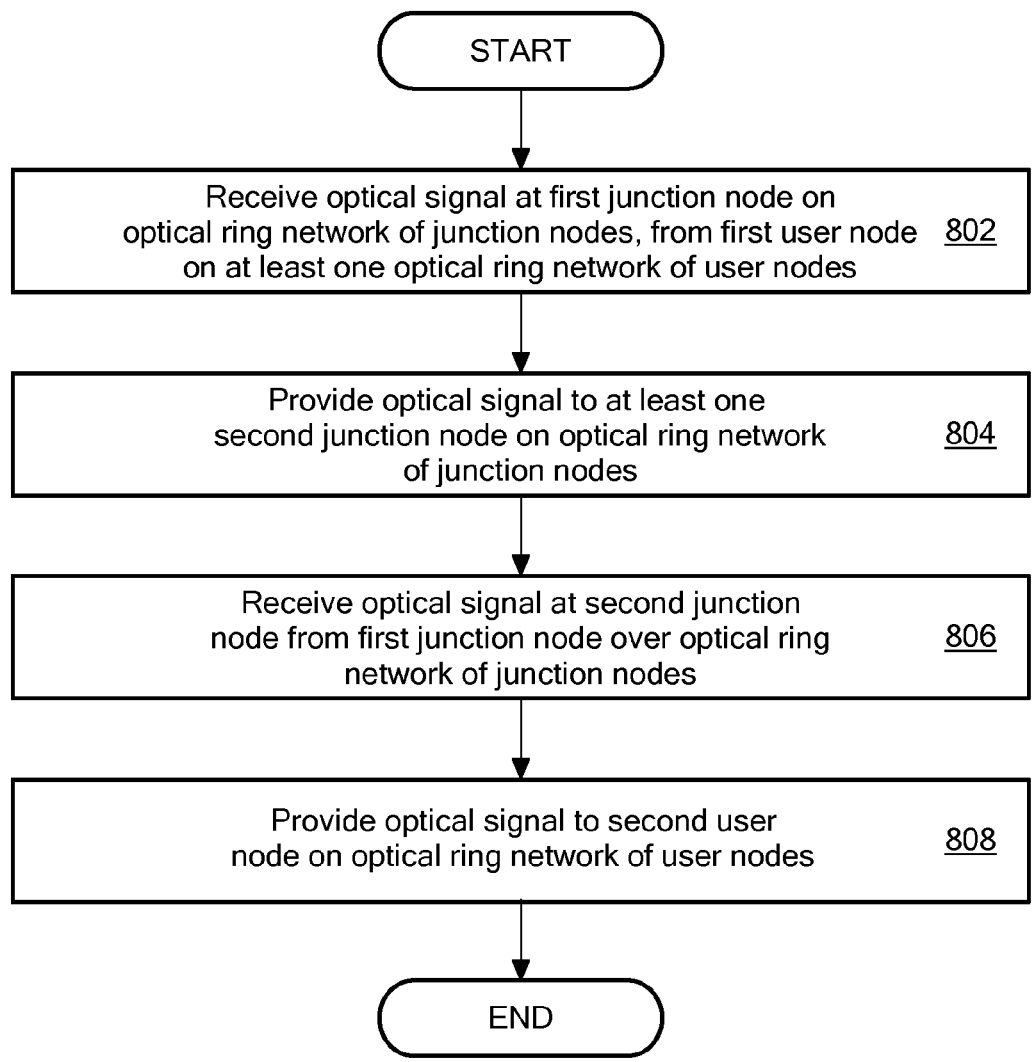
FIG. 8 is a flow diagram illustrating an exemplary method of using optical junction nodes, in accordance with the present application.

An exemplary method of using optical junction nodes ("junction nodes") to communicably couple a plurality of optical nodes ("user nodes") on at least one optical node ring in a data center network is described below with reference to FIG. 8. As depicted in step 802, an optical signal is received, at a first junction node on a junction node ring, from a first user node on at least one optical node ring. As depicted in step 804, the optical signal is provided, by the first junction node, to at least one second junction node on the junction node ring. As depicted in step 806, the optical signal is received at the second junction node from the first junction node over the junction node ring. As depicted in step 808, the optical signal is provided, by the second junction node, to a second user node on the at least one optical node ring.

It is noted that the operations depicted and/or described herein are purely exemplary. Further, the operations can be used in any sequence, when appropriate, and/or can be partially used. With the above illustrative embodiments in mind, it should be understood that such illustrative embodiments can employ various computer-implemented operations involving data transferred or stored in computer systems. Such operations are those requiring physical manipulation of physical quantities. Typically, though not necessarily, such quantities take the form of electrical, magnetic, and/or optical signals capable of being stored, transferred, combined, compared, and/or otherwise manipulated.

Further, any of the operations depicted and/or described herein that form part of the illustrative embodiments are useful machine operations. The illustrative embodiments also relate to a device or an apparatus for performing such operations. The apparatus can be specially constructed for the required purpose, or can be a general-purpose computer selectively activated or configured by a computer program stored in the computer to perform the function of a particular machine. In particular, various general-purpose machines employing one or more processors coupled to one or more computer readable media can be used with computer programs written in accordance with the teachings disclosed herein, or it may be more convenient to construct a more specialized apparatus to perform the required operations.

Instructions for implementing the systems and methods disclosed herein can also be embodied as computer readable code on a computer readable medium. The computer readable medium is any data storage device that can store data, which can thereafter be read by a computer system. Examples of such computer readable media include magnetic and solid state hard drives, read-only memory (ROM), random-access memory (RAM), Blu-Ray™ disks, DVDs, CD-ROMs, CD-Rs, CD-RWs, magnetic tapes, and/or any other suitable optical or non-optical data storage device. The computer readable code can be stored in a single location, or stored in a distributed manner in a networked environment.

The foregoing description has been directed to particular illustrative embodiments of this disclosure. It will be apparent, however, that other variations and modifications may be made to the described embodiments, with the attainment of some or all of their associated advantages. Moreover, the procedures, processes, and/or modules described herein may be implemented in hardware, software, embodied as a computer-readable medium having program instructions, firmware, or a combination thereof. For example, the functions described herein may be performed by a processor executing program instructions out of a memory or other storage device.

It will be appreciated by those skilled in the art that modifications to and variations of the above-described systems and methods may be made without departing from the inventive concepts disclosed herein. Accordingly, the disclosure should not be viewed as limited except as by the scope and spirit of the appended claims.

What is claimed is:

1. A data center network architecture, comprising:
    at least one optical ring network of junction nodes, the optical ring network of junction nodes including at least a first junction node and a second junction node; and
    one or more optical ring networks of user nodes,
    wherein the first junction node is communicably coupled to at least a first user node on the one or more optical ring networks of user nodes,
    wherein the second junction node is communicably coupled to at least a second user node on the one or more optical ring networks of user nodes,
    thereby interconnecting the first user node and the second user node on the one or more optical ring networks of user nodes via the optical ring network of junction nodes,
    wherein the first junction node and the second junction node each include a plurality of inputs, a plurality of outputs, and a plurality of connection paths disposed between the plurality of inputs to the plurality of outputs,
    wherein the plurality of inputs of each first and second junction node are in a first predetermined sequence,
    wherein the plurality of outputs of each first and second junction node are in the first predetermined sequence,
    wherein the plurality of inputs and the plurality of outputs of each first and second junction node have predetermined positions in the first predetermined sequence, and
    wherein, for each first and second junction node, at least some of the plurality of connection paths are each operative to communicably couple a specific input to a specific output, the predetermined positions of the specific input and the specific output in the first predetermined sequence differing by at least one position in the first predetermined sequence.

2. The data center network architecture of claim 1 wherein the first user node and the second user node each include a plurality of inputs, a plurality of outputs, and a plurality of connection paths disposed between the plurality of inputs to the plurality of outputs, wherein the plurality of inputs of each first and second user node are in a second predetermined sequence, wherein the plurality of outputs of each first and second user node are in the second predetermined sequence, wherein the plurality of inputs and the plurality of outputs of each first and second user node have predetermined positions in the second predetermined sequence, and wherein, for each first and second user node, at least some of the plurality of connection paths are each operative to communicably couple a specific input to a specific output, the predetermined positions of the specific input and the specific output in the second predetermined sequence differing by at least one position in the second predetermined sequence.

3. The data center network architecture of claim 2 wherein at least a first one of the plurality of connection paths included in the first junction node is communicably coupled to the first user node, and wherein at least a second one of the plurality of connection paths included in the second junction node is communicably coupled to the second user node.

4. The data center network architecture of claim 3 wherein at least a first one of the plurality of connection paths included in the first user node is communicably coupled to the first one of the plurality of connection paths included in the first junction node, and wherein at least a second one of the plurality of connection paths included in the second user node is communicably coupled to the second one of the plurality of connection paths included in the second junction node.

5. The data center network architecture of claim 2 wherein the first junction node and the second junction node each include at least one drop module communicably coupled to at least one of the plurality of connection paths included in the respective junction node, the drop module being operative to receive at least one optical signal carried by the respective connection path, and to separate at least one first wavelength channel signal allocated to at least one first wavelength channel from the optical signal.

6. The data center network architecture of claim 5 wherein the first wavelength channel signal corresponds to one of a wavelength division multiplexing (WDM) signal, a dense wavelength division multiplexing (DWDM) signal, and a coarse wavelength division multiplexing (CWDM) signal.

7. The data center network architecture of claim 5 wherein the first user node and the second user node each include at least one add module communicably coupled to at least one of the plurality of connection paths included in the respective user node, the add module being operative to receive the first wavelength channel signal from the drop module included in the respective junction node communicably coupled thereto, and to add the first wavelength channel signal to the respective connection path included in the respective user node for subsequent transmission.

8. The data center network architecture of claim 1 wherein the one or more optical ring networks of user nodes includes a single optical ring network of user nodes, the single optical ring network of user nodes including both the first user node and the second user node.

9. The data center network architecture of claim 1 wherein the one or more optical ring networks of user nodes includes at least a first optical ring network of user nodes and a second optical ring network of user nodes, the first optical ring network of user nodes including the first user node, and the second optical ring network of user nodes including the second user node.

10. A method of using at least one junction node to communicably couple a plurality of user nodes on one or more optical ring networks, comprising the steps of:
    receiving, at a first junction node on an optical ring network of junction nodes, an optical signal from a first user node on the one or more optical ring networks of user nodes;
    providing, by the first junction node, the optical signal to at least one second junction node on the optical ring network of junction nodes;
    receiving, at the second junction node over the optical ring network of junction nodes, the optical signal from the first junction node;
    providing, by the second junction node, the optical signal to a second user node on the one or more optical ring networks of user nodes;
    wherein the first junction node and the second junction node each include a plurality of inputs, a plurality of outputs, and a plurality of connection paths disposed between the plurality of inputs to the plurality of outputs,
    wherein the plurality of inputs of each first and second junction node are in a first predetermined sequence,
    wherein the plurality of outputs of each first and second junction node are in the first predetermined sequence, wherein the plurality of inputs and the plurality of outputs of each first and second junction node have predetermined positions in the first predetermined sequence, and wherein the method further comprises the step of:

for each first and second junction node, communicably coupling, by at least some of the plurality of connection paths, a specific input to a specific output, the predetermined positions of the specific input and the specific output in the first predetermined sequence differing by at least one position in the first predetermined sequence.

11. The method of claim 10 wherein the first user node and the second user node each include a plurality of inputs, a plurality of outputs, and a plurality of connection paths disposed between the plurality of inputs to the plurality of outputs, wherein the plurality of inputs of each first and second user node are in a second predetermined sequence, wherein the plurality of outputs of each first and second user node are in the second predetermined sequence, wherein the plurality of inputs and the plurality of outputs of each first and second user node have predetermined positions in the second predetermined sequence, and wherein the method further comprises the step of:

for each first and second user node, communicably coupling, by at least some of the plurality of connection paths, a specific input to a specific output, the predetermined positions of the specific input and the specific output in the second predetermined sequence differing by at least one position in the second predetermined sequence.

12. The method of claim 11 further comprising the steps of:

communicably coupling at least a first one of the plurality of connection paths included in the first junction node to the first user node; and communicably coupling at least a second one of the plurality of connection paths included in the second junction node to the second user node.

13. The method of claim 12 further comprising the steps of:

communicably coupling at least a first one of the plurality of connection paths included in the first user node to the first one of the plurality of connection paths included in the first junction node; and communicably coupling at least a second one of the plurality of connection paths included in the second user node to the second one of the plurality of connection paths included in the second junction node.

14. The method of claim 11 further comprising the steps of:

receiving, at at least one drop module communicably coupled to at least one of the plurality of connection paths included in a respective one of the first and second junction nodes, at least one optical signal carried by the respective connection path; and separating, by the drop module, at least one first wavelength channel signal allocated to at least one first wavelength channel from the optical signal.

15. The method of claim 14 wherein the first wavelength channel signal corresponds to one of a wavelength division multiplexing (WDM) signal, a dense wavelength division multiplexing (DWDM) signal, and a coarse wavelength division multiplexing (CWDM) signal.

16. The method of claim 14 further comprising the steps of:

receiving, at at least one add module communicably coupled to at least one of the plurality of connection paths included in a respective one of the first and second user nodes, the first wavelength channel signal from the drop module included in the respective junction node communicably coupled thereto; and adding the first wavelength channel signal to the respective connection path included in the respective user node for subsequent transmission.

17. The method of claim 10 wherein the one or more optical ring networks of user nodes includes a single optical ring network of user nodes, the single optical ring network of user nodes including both the first user node and the second user node.

18. The method of claim 10 wherein the one or more optical ring networks of user nodes includes at least a first optical ring network of user nodes and a second optical ring network of user nodes, the first optical ring network of user nodes including the first user node, and the second optical ring network of user nodes including the second user node.

* * * * *